US007292581B2

(12) United States Patent
Finn

(10) Patent No.: US 7,292,581 B2
(45) Date of Patent: Nov. 6, 2007

(54) LARGE-SCALE LAYER 2 METROPOLITAN AREA NETWORK

(75) Inventor: Norman W. Finn, Livermore, CA (US)

(73) Assignee: Cisco Technology, Inc., San Jose, CA (US)

( * ) Notice: Subject to any disclaimer, the term of this patent is extended or adjusted under 35 U.S.C. 154(b) by 993 days.

(21) Appl. No.: 10/279,360

(22) Filed: Oct. 24, 2002

(65) Prior Publication Data

US 2004/0081171 A1 Apr. 29, 2004

(51) Int. Cl.
H04L 12/28 (2006.01)

(52) U.S. Cl. .................................. 370/395.53; 370/256
(58) Field of Classification Search ........... 370/395.53, 370/256
See application file for complete search history.

(56) References Cited

U.S. PATENT DOCUMENTS

| | | | |
|---|---|---|---|
| 5,959,968 A | 9/1999 | Chin et al. | |
| 5,959,989 A | 9/1999 | Gleeson et al. | |
| 6,163,543 A | 12/2000 | Chin et al. | |
| 6,188,694 B1 | 2/2001 | Fine et al. | |
| 6,236,659 B1 | 5/2001 | Pascoe | |
| 6,298,061 B1 | 10/2001 | Chin et al. | |
| 6,446,131 B1 * | 9/2002 | Khansari et al. | 709/238 |
| 6,560,236 B1 * | 5/2003 | Varghese et al. | 370/401 |
| 7,061,876 B2 * | 6/2006 | Ambe | 370/256 |
| 7,127,523 B2 * | 10/2006 | Kotser | 709/238 |

OTHER PUBLICATIONS

U.S. Appl. No. 09/575,774, Thomas Edsall, et al.

Lasserre et al., Transparent VLAN Services over MPLS, IETF Internet Draft, Aug. 2001, pp. 1-11.
Finn, N., Bridge-Based Ethernet Services Provision, IEEE 802.1, Oct. 5, 2002, pp. 1-59.
Finn, N., Bridge-Based Ethernet Service Provision, IEEE 802.1, Oct. 12, 2002, pp. 1-57.
Ethernet over MPLS for the Cisco 7600 Series Internet Routers, Cisco Systems, Inc., Jun. 5, 2002, pp. 1-27.
MPLS Traffic Engineering Fast Reroute-Link Protection, Cisco Systems, Inc. Aug. 2, 2001, pp. 1-24.
Securing Networks with Private VLANs and VLAN access Control Lists, http://www.cisco.com/warp/public/473/90.shtml, pp. 1-22.
Understanding and Configuring Private VLANs, Cisco Systems, Inc., Sep. 12, 2002, pp. 1-13.

(Continued)

*Primary Examiner*—Brian Nguyen
(74) *Attorney, Agent, or Firm*—Cesari and McKenna LLP

(57) ABSTRACT

A system and method permits the creation of very-large metropolitan area networks (MANs) using Layer 2 (L2) switching technology. Different groups of L2 switches are logically organized into Islands. Connected to each Island are a plurality of customers sites, and an interconnect fabric couples the Islands together. The Islands cooperate to provide a Virtual Ethernet Connection (VEC) to each set of customer sites being coupled together. Customers identify their traffic that corresponds to a VEC by labeling or tagging it with a Customer-Equipment VLAN Identifier (CE-VLAN ID). Within each Island, the CE-VLAN ID specified by the customer's traffic (and hence the corresponding VEC) is mapped to a unique MAN Provider-Equipment VLAN ID (PE-VLAN ID). To prevent the formation of loops, the Islands run the Inter-MAN Control Protocol (IMCP), which represents a modified version of the Multiple Spanning Tree Protocol (MSTP).

25 Claims, 11 Drawing Sheets

OTHER PUBLICATIONS

Cisco Metro Solutions Portfolio, Cisco Sytems, Inc., (c) 1992-2001, pp. 1-13.

Tolley, B., Strategic Directions Moving the Decimal Point: An Introduction to 10 Gigabit Etherenet, Cisco Sytems, Inc., (c) 2000, pp. 1-17.

Dynamic Packet Transport Technology and Applications Overview, Cisco Sytems, Inc., (c) 1999, pp. 1-17.

Dynamic Packet Transport Technology and Performance, Cisco Systems, Inc., (c) 2000, pp. 1-13.

Lasserre, M., MPLS based Transparent LAN services, River Stone Networks, Inc., (c) 2001-2002, pp. 1-10.

Martini, et al., Transport of Layer 2 Frames Over MPLS, IETF Internet Draft, Apr. 2002, pp. 1-16.

Martini, et al., Encapsulation Methods for Transport of Layer 2 Frames Over IP and MPLS Networks, IETF Internet Draft, Nov. 1, 2001, pp. 1-14.

Configuring Spanning Tree, Cisco Sytems, Inc., Dec. 10, 2001, pp. 1-60.

Multiprotocol Encapsulation over ATM Adaptation Layer 5, Network Working Group Request for Comments: 2684, Sep. 1999, pp. 1-22.

"P802.1s Drsft Standard for Local and Metropolitan Area Networks-Amendment 3 to 802.1q Virtual Bridged Local Area Networks: Multiple Spanning Trees," Internetworking Task Group, Institute of Electrical and Electronics Engineers (IEEE) 802.1, IEEE, Inc., New York, NY, (c) 2002, pp. 1-222.

Notification of Transmittal of International Preliminary Report on Patentability, mailed Dec. 1, 2006, Cisco Technology, Inc., PCT/US03/33215, International Filing Date: Oct. 21, 2003, 6 pgs.

* cited by examiner

| 502 | 503 | 504 | 506 |
|---|---|---|---|
| ISLAND ID | CONFIGURATION NAME | REVISION LEVEL | CONFIGURATION DIGEST |

FIG. 5

VLAN MAPPING TABLE 600

| CE-VLAN ID (602) | VEC (604) | PE-VLAN ID (606) | UNI (608) | VEC PORT (610) | |
|---|---|---|---|---|---|
| 0014 | 001 | 4011 | 01 | 00 | 614a |
| 0038 | 002 | 4027 | 01 | 01 | 614b |
| 0018 | 002 | 4017 | 00 | 00 | 614c |
| | | | | | |
| | | | | | |
| | | | | | |

FIG. 6

INTER-ISLAND TRUNK MAPPING TABLE 700

| PE-VLAN ID (702) | VEC (704) | INTER-ISLAND TRUNK ID (706) | |
|---|---|---|---|
| 4027 | 002 | 6042 | 710a |
| 4017 | 002 | 6042 | 710b |
| - | 301 | 6042 | 710c |
| | | | |

FIG. 7

LARGE-SCALE LAYER 2 METROPOLITAN AREA NETWORK

BACKGROUND OF THE INVENTION

1. Field of the Invention

This invention relates to computer networks and, more specifically, to large-scale metropolitan area networks.

2. Background Information

Many organizations, including businesses, governments and educational institutions, utilize computer networks so that employees and others may share and exchange information and/or resources. A computer network typically comprises a plurality of entities interconnected by means of one or more communications media. An entity may consist of any device, such as a computer, that "sources" (i.e., transmits) or "sinks" (i.e., receives) data frames over the communications media. A common type of computer network is a local area network ("LAN") which typically refers to a privately owned network within a single building or campus. LANs typically employ a data communication protocol (LAN standard), such as Ethernet, FDDI or token ring, that defines the functions performed by data link and physical layers of a communications architecture (i.e., a protocol stack).

One or more intermediate network devices are often used to couple LANs together and allow the corresponding entities to exchange information. For example, a bridge may be used to provide a "switching" function between two or more LANs or end stations. Typically, the bridge is a computer and includes a plurality of ports that are coupled via LANs either to other bridges, or to end stations such as routers or host computers. Ports used to couple bridges to each other are generally referred to as a trunk ports, whereas ports used to couple bridges to end stations are generally referred to as access ports. The bridging function includes receiving data from a sending entity at a source port and transferring that data to at least one destination port for forwarding to one or more receiving entities.

Ethernet

Ethernet is one of the most common LAN standards used today. The original Ethernet transmission standard, referred to as 10 Base-T, is capable of transmitting data at 10 Megabits per second (Mbs). In 1995, the Institute of Electrical and Electronics Engineers (IEEE) approved a Fast Ethernet transmission standard, referred to as 100 Base-T, which is capable of operating at 100 Mbs. Both 10 Base-T and 100 Base-T, however, are limited to cable lengths that are less than 100 meters. A committee of the IEEE, known as the 802.3z committee, is currently working on Gigabit Ethernet, also referred to as 1000 Base-X (fiber channel) and 1000 Base-T (long haul copper), for transmitting data at 1000 Mbs. In addition to the substantially increased transmission rate, Gigabit Ethernet also supports cable lengths of up to 3000 meters. Gigabit Ethernet thus represents a potentially significant increase in the size or range of Ethernet LANS.

Spanning Tree Algorithm

Most computer networks include redundant communications paths so that a failure of any given link does not isolate any portion of the network. Such networks are typically referred to as meshed or partially meshed networks. The existence of redundant links, however, may cause the formation of circuitous paths or "loops" within the network. Loops are highly undesirable because data frames may traverse the loops indefinitely.

Furthermore, some devices, such as bridges or switches, replicate frames whose destination is not known resulting in a proliferation of data frames along loops. The resulting traffic can overwhelm the network. Other intermediate devices, such as routers, that operate at higher layers within the protocol stack, such as the Internetwork Layer of the Transmission Control Protocol/Internet Protocol ("TCP/IP") reference model, deliver data frames and learn the addresses of entities on the network differently than most bridges or switches, such that routers are generally not susceptible to sustained looping problems.

To avoid the formation of loops, most bridges and switches execute a spanning tree protocol which allows them to calculate an active network topology that is loop-free (i.e., a tree) and yet connects every pair of LANs within the network (i.e., the tree is spanning). The IEEE has promulgated a standard (IEEE Std. 802.1D-1998™) that defines a spanning tree protocol to be executed by 802.1D compatible devices. In general, by executing the 802.1D spanning tree protocol, bridges elect a single bridge within the bridged network to be the "Root Bridge". The 802.1D standard takes advantage of the fact that each bridge has a unique numerical identifier (bridge ID) by specifying that the Root Bridge is the bridge with the lowest bridge ID. In addition, for each LAN coupled to any bridge, exactly one port (the "Designated Port") on one bridge (the "Designated Bridge") is elected. The Designated Bridge is typically the one closest to the Root Bridge. All ports on the Root Bridge are Designated Ports, and the Root Bridge is the Designated Bridge on all the LANs to which it has ports.

Each non-Root Bridge also selects one port from among its non-Designated Ports (its "Root Port") which gives the lowest cost path to the Root Bridge. The Root Ports and Designated Ports are selected for inclusion in the active topology and are placed in a forwarding state so that data frames may be forwarded to and from these ports and thus onto the LANs interconnecting the bridges and end stations of the network. Ports not included within the active topology are placed in a blocking state. When a port is in the blocking state, data frames will not be forwarded to or received from the port. A network administrator may also exclude a port from the spanning tree by placing it in a disabled state.

To obtain the information necessary to run the spanning tree protocol, bridges exchange special messages called configuration bridge protocol data unit (BPDU) messages or simply BPDUs. BPDUs carry information, such as assumed root and lowest root path cost, used in computing the active topology. More specifically, upon start-up, each bridge initially assumes itself to be the Root Bridge and transmits BPDUs accordingly. Upon receipt of a BPDU from a neighboring device, its contents are examined and compared with similar information (e.g., assumed root and lowest root path cost) stored by the receiving bridge in memory. If the information from the received BPDU is "better" than the stored information, the bridge adopts the better information and uses it in the BPDUs that it sends (adding the cost associated with the receiving port to the root path cost) from its ports, other than the port on which the "better" information was received. Although BPDUs are not forwarded by bridges, the identifier of the Root Bridge is eventually propagated to and adopted by all bridges as described above, allowing them to select their Root Port and any Designated Port(s).

In order to adapt the active topology to changes and failures, the Root Bridge periodically (e.g., every hello time) transmits BPDUs. In response to receiving BPDUs on their Root Ports, bridges transmit their own BPDUs from their Designated Ports, if any. Thus, BPDUs are periodically propagated throughout the bridged network, confirming the active topology. As BPDU information is updated and/or timed-out and the active topology is re-calculated, ports may transition from the blocking state to the forwarding state and vice versa. That is, as a result of new BPDU information, a previously blocked port may learn that it should be in the forwarding state (e.g., it is now the Root Port or a Designated Port).

Rapid Spanning Tree Protocol

Recently, the IEEE promulgated a new standard (the IEEE Std. 802.1W-2001™ specification standard) that defines a Rapid Spanning Tree Protocol (RSTP). The RSTP similarly selects one bridge of a bridged network to be the Root Bridge and defines an active topology that provides complete connectivity among the LANs while severing any loops. Each individual port of each bridge is assigned a port role according to whether the port is to be part of the active topology. The port roles defined by the 802.1w specification standard include Root, Designated, Alternate and Backup. The bridge port offering the best, e.g., lowest cost, path to the Root Port is assigned the Root Port Role. Each bridge port offering an alternative, e.g., higher cost, path to the Root Bridge is assigned the Alternate Port Role. For each LAN, the one port providing the lowest cost path to the Root Bridge from that LAN is assigned the Designated Port Role, while all other ports coupled to the LAN are assigned the Root, Backup or, in some cases, the Alternate Port Role. At the Root Bridge, all ports are assigned the Designated Port Role.

Those ports that have been assigned the Root Port and Designated Port Roles are placed in the forwarding state, while ports assigned the Alternate and Backup Roles are placed in a state. A port assigned the Root Port Role can be rapidly transitioned to the forwarding state provided that all of the ports assigned the Alternate Port Role are placed in the blocking state. Similarly, if a failure occurs on the port currently assigned the Root Port Role, a port assigned the Alternate Port Role can be reassigned to the Root Port Role and rapidly transitioned to the forwarding state, provided that the previous Root Port has been transitioned to the discarding or blocking state. A port assigned the Designated Port Role or a Backup Port that is to be reassigned to the Designated Port Role can be rapidly transitioned to the forwarding state, provided that the roles of the ports of the downstream bridge are consistent with this port being assigned the Designated Port Role. The RSTP provides an explicit handshake to be used by neighboring bridges to confirm that a new Designated Port can rapidly transition to the forwarding state.

Like the STP described in the 802.1D specification standard, bridges running RSTP also exchange BPDUs in order to determine which roles to assign to the bridge's ports. The BPDUs are also utilized in the handshake employed to rapidly transition Designated Ports to the forwarding state.

Virtual Local Area Networks

A computer network may also be segmented into a series of logical networks. For example, U.S. Pat. No. 5,394,402, issued Feb. 28, 1995 to Ross (the "'402 Patent"), discloses an arrangement for associating any port of a switch with any particular network segment. Specifically, according to the '402 Patent, any number of physical ports of a particular switch may be associated with any number of groups within the switch by using a virtual local area network (VLAN) arrangement that virtually associates the port with a particular VLAN designation. More specifically, the switch or hub associates VLAN designations with its ports and further associates those VLAN designations with messages transmitted from any of the ports to which the VLAN designation has been assigned.

The VLAN designation for each port is stored in a memory portion of the switch such that every time a message is received on a given access port the VLAN designation for that port is associated with the message. Association is accomplished by a flow processing element which looks up the VLAN designation in the memory portion based on the particular access port at which the message was received. In many cases, it may be desirable to interconnect a plurality of these switches in order to extend the VLAN associations of ports in the network. Those entities having the same VLAN designation function as if they are all part of the same LAN. VLAN-configured bridges are specifically configured to prevent message exchanges between parts of the network having different VLAN designations in order to preserve the boundaries of each VLAN. Nonetheless, intermediate network devices operating above L2, such as routers, can relay messages between different VLAN segments.

In addition to the '402 Patent, the IEEE promulgated the 802.1Q specification standard for Virtual Bridged Local Area Networks. To preserve VLAN associations of messages transported across trunks or links in VLAN-aware networks, both Ross and the IEEE Std. 802.1Q-1998 specification standard disclose appending a VLAN identifier (VID) field to the corresponding frames. In addition, U.S. Pat. No. 5,742,604 to Edsall et al. (the "'604 patent"), which is commonly owned with the present application, discloses an Interswitch Link (ISL) encapsulation mechanism for efficiently transporting packets or frames, including VLAN-modified frames, between switches while maintaining the VLAN association of the frames. In particular, an ISL link, which may utilize the Fast Ethernet standard, connects ISL interface circuitry disposed at each switch. The transmitting ISL circuitry encapsulates the frame being transported within an ISL header and ISL error detection information, while the ISL receiving circuitry strips off this information and recovers the original frame.

Multiple Spanning Tree Protocol

The IEEE is also working on a specification standard for a Spanning Tree Protocol that is specifically designed for use with networks that support VLANs. The Multiple Spanning Tree Protocol (MSTP), which is described in the IEEE 802.1s draft specification standard, organizes a bridged network into regions. Within each region, MSTP establishes an Internal Spanning Tree (IST) which provides connectivity to all bridges within the respective region and to the ISTs established within other regions. The IST established within each MSTP Region also provides connectivity to the one Common Spanning Tree (CST) established outside of the MSTP regions by IEEE Std. 802.1Q-1998 compatible bridges running STP or RSTP. The IST of a given MST Region receives and sends BPDUs to the CST. Accordingly, all bridges of the bridged network are connected by a single Common and Internal Spanning Tree (CIST). From the point of view of the legacy or IEEE 802.1Q bridges, moreover, each MST Region appears as a single virtual bridge on the CST.

Within each MST Region, the MSTP compatible bridges establish a plurality of active topologies, each of which is called a Multiple Spanning Tree Instance (MSTI). The MSTP bridges also assign or map each VLAN to one and only one of the MSTIs. Because VLANs may be assigned to different MSTIs, frames associated with different VLANs can take different paths through an MSTP Region. The bridges may but typically do not compute a separate topology for every single VLAN, thereby conserving processor and memory resources. Each MSTI is basically a simple RSTP instance that exists only inside the respective Region, and the MSTIs do not interact outside of the Region.

MSTP, like the other spanning tree protocols, uses BPDUs to establish the ISTs and MSTIs as well as to define the boundaries of the different MSTP Regions. The bridges do not send separate BPDUs for each MSTI. Instead, every MSTP BPDU carries the information needed to compute the active topology for all of the MSTIs defined with the respective Region. Each MSTI, moreover, has a corresponding Identifier (ID) and the MSTI IDs are encoded into the bridge IDs. That is, each bridge has a unique ID, as described above, and this ID is made up of a fixed portion and a settable portion. With MSTP, the settable portion of a bridge's ID is further organized to include a system ID extension. The system ID extension corresponds to the MSTI ID. The MSTP compatible bridges within a given Region will thus have a different bridge ID for each MSTI. For a given MSTI, the bridge having the lowest bridge ID for that instance is elected the root. Thus, an MSTP compatible bridge may be the root for one MSTI but not another within a given MSTP Region.

Each bridge running MSTP also has a single MST Configuration Identifier (ID) that consists of three attributes: an alphanumeric configuration name, a revision level and a VLAN mapping table that associates each of the potential 4096 VLANs to a corresponding MSTI. Each bridge, moreover loads its MST Configuration ID into the BPDUs sourced by the bridge. Because bridges only need to know whether or not they are in the same MST Region, they do not propagate the actual VLAN to MSTI tables in their BPDUs. Instead, the MST BPDUs carry only a digest of the VLAN to MSTI table or mappings. The digest is generated by applying the well-know MD-5 algorithm to the VLAN to MSTI table. When a bridge receives an MST BPDU, it extracts the MST Configuration ID contained therein, including the digest, and compares it to its own MST Configuration ID to determine whether it is in the same MST Region as the bridge that sent the MST BPDU. If the two MST Configuration IDs are the same, then the two bridges are in the same MST Region. If, however, the two MST Configuration IDs have at least one non-matching attribute, i.e., either different configuration names, different revision levels and/or different computed digests, then the bridge that received the BPDU concludes that it is in a different MST Region than the bridge that sourced the BPDU. A port of an MST bridge, moreover, is considered to be at the boundary of an MST Region if the Designated Bridge is in a different MST Region or if the port receives legacy BPDUs.

FIG. 1 is a highly schematic block diagram of an MST BPDU 100. The MST BPDU 100 includes a header 102 compatible with the Media Access Control (MAC) layer of the respective LAN standard, e.g., Ethernet. The header 102 comprises a destination address (DA) field, a source address (SA) field, a Destination Service Access Point (DSAP) field, and a Source Service Access Point (SSAP), among others. The DA field 104 carries a unique bridge multicast destination address assigned to the spanning tree protocol, and the DSAP and SSAP fields carry standardized identifiers assigned to the spanning tree protocol. Appended to header 102 is a BPDU message area that includes an "outer" part 104 and an "inner" part 106. The outer part 104 has the same format as an RSTP BPDU message and is recognized as a valid RSTP BPDU message by bridges that do not implement MSTP. The "inner" part 106 is utilized by bridges executing MSTP to establish the IST and the MSTIs. The inner part 106 has a set of spanning tree parameters for the IST and a set of parameters for each MSTI supported by the bridge sourcing the MSTP BPDU 100.

Outer part 104, also referred to as the CIST priority vector, has a plurality of fields, including a protocol identifier (ID) field 108, a protocol version ID field 110, a BPDU type field 112, a flags field 114, a CIST root ID field 116, an external path cost field 118, a CIST regional root ID field 120, a CIST port ID field 122, a message age field 124, a maximum (MAX) age field 126, a hello time field 128, and a forward delay field 130. The CIST root identifier field 116 contains the identifier of the bridge assumed to be the root of the Common and Internal Spanning Tree, which may be in the same MSTP Region as the bridge sourcing the BPDU message 100, in another MSTP Region or in part of the bridged network that is not running MSTP. The external path cost field 118 contains a value representing the lowest cost from the bridge sourcing the BPDU 100 to the CIST root identified in field 116 without passing through any other bridge in the same region as the bridge that is sourcing the BPDU message 100.

Inner part 106, also referred to as an MSTI priority vector, similarly has a plurality of fields, including a version 1 length field 132, a null field 134, a version 3 length field 136, an MST configuration ID field 138, a CIST regional root ID field 140, a CIST regional path cost field 142, a CIST bridge ID field 144, a CIST port ID field 146, a CIST flags field 148, and a CIST hops field 150. Inner part 106 may further include one or more optional MSTI configuration messages 152, each of which constitutes another MSTI priority vector or M-record.

Because version 2 of the RSTP does not specify any additional fields beyond those already specified by version 1, the MST BPDU does not have a version 2 length field.

As mentioned above, the MST configuration ID field 138 is made up of three sub-fields: a configuration name sub-field 154, a revision level sub-field 156 and an MD-5 checksum sub-field 158. The configuration name sub-field 154 carries a variable length text string encoded within a fixed size, e.g., 32-octets. The revision level sub-field 156 carries an integer encoded within a fixed field of two octets. The MD-5 checksum sub-field 158 carries a 16-octet signature created by applying the MD-5 algorithm to the bridge's VLAN to MSTI table, which contains 4096 consecutive two octet elements.

Each MSTI Configuration Message 152 consists of a plurality of fields including a CIST regional root ID field 160, a CIST regional path cost field 162, a CIST bridge ID field 164, a CIST port ID field 166, a CIST flags field 168 and a CIST hops field 170. MST bridges utilize the STP parameters contained in fields 140-150 of inner part 106 and in each MSTI configuration message 152 to compute an active topology for each MSTI configured in the respective region.

Metropolitan Area Networks (MANs)

Multiple LANs and/or end stations may be interconnected by point-to-point links, microwave transceivers, satellite hook-ups, etc. to form a metropolitan area network (MAN) that typically spans several city blocks, an entire city and/or an entire metropolitan area, such as the San Francisco Bay Area. The MAN typically interconnects multiple LANs and/or end stations located at individual campuses and/or buildings that are physically remote from each other, but that are still within the metropolitan area. Conventional MANs typically rely on network equipment employing Asynchronous Transfer Mode (ATM) running over the existing Public Switched Telephone Network's (PSTN's) Synchronous Optical Network (SONET). As most LANs utilize the Ethernet standard, network messages or packets created at one LAN must be converted from Ethernet format into ATM cells for transmission over the SONET links. The ATM cells must then be converted back into Ethernet format for delivery to the destination LAN or end station. The need to convert each network message from Ethernet to ATM and back again requires the MAN to include expensive networking equipment. The MAN Provider also has to lease or otherwise obtain access to the SONET links. As a result, MANs can be expensive to build and operate.

Accordingly, a need exists for a system and method for building and operating MANs more efficiently.

SUMMARY OF THE INVENTION

Briefly, the invention is directed to a system and method for building very-large metropolitan area networks (MANS) using Layer 2 (L2) switching technology. In the illustrative embodiment, different groups of L2 switches are logically organized into Islands. Each Island, moreover, is configured as a separate administrative domain. Connected to each Island are a plurality of customers sites, which are typically local area networks (LANs). An interconnect fabric is utilized to couple the Islands together so that a customer site connected to a first Island can communicate with a customer site connected either to the same or a second Island. In the illustrative embodiment, the interconnect fabric is formed from a plurality of Layer 3 (L3) devices configured to provide an Emulated VLAN over Multiple Label Switching Protocol (EVoMPLS) service, where EVoMPLS is the analogy, over MPLS, of ATM LAN Emulation (ATM Forum standard af-lane-0021.000). Alternatively, the interconnect fabric may be formed of an Ethernet LAN using 802.1Q or similar tags. The Islands cooperate to provide a Virtual Ethernet Connection (VEC) to each set of customer sites being coupled together. Customers identify their traffic that corresponds to a VEC by labeling or tagging it with a Customer-Equipment VLAN Identifier (CE-VLAN ID). Within each Island, the CE-VLAN ID specified by the customer's traffic (and hence the corresponding VEC) is mapped to a unique MAN Provider-Equipment VLAN ID (PE-VLAN ID). The PE-VLAN ID selected for a given VEC in one Island may differ from the PE-VLAN ID selected for the given VEC but used in another Island. For each VEC that traverses the interconnect fabric, an Inter-Island Trunk is established to carry VEC traffic between the two Islands. The Inter-Island Trunk is a logical construct that functions, at least from the point of view of the Islands, as a shared medium. Specifically, the Islands joined by an Inter-Island Trunk are configured to append the same Virtual Circuit Identifier (ID), preferably as an MPLS label, to network messages being placed on the Inter-Island Trunk. Network messages received at an Island from the Inter-Island have their Virtual Circuit ID label and any other labels stripped off before being transmitted to the respective customer site.

The concatenated MAN consisting of Islands and interconnect fabric may be expected to be too large for any of the standard Spanning Tree Protocols to serve satisfactorily to prevent the formation of loops. To prevent the formation of loops within the MAN, the Islands are configured to prevent two or more VECs from sharing the same Inter-Island Trunk. The Islands also run a new protocol, the Inter-MAN Control Protocol (IMCP), which represents a modified version of the Multiple Spanning Tree Protocol (MSTP). Specifically, the L2 devices disposed in each Island are configured with a new Multiple Spanning Tree (MST) Configuration ID that includes an Island name in addition to the configuration name, revision level and checksum. Furthermore, the L2 devices disposed in the same Island are all given the same Island ID, configuration name and revision level. Each Island thus identifies itself as a separate MSTP Region. Second, the L2 devices within each Island also ensure that, for each VEC that crosses the interconnect fabric, all but one of the redundant links connecting the Island to the interconnect fabric are blocked. As a result, loops that might otherwise result from the presence of redundant links between the customer sites and the Islands are severed, regardless of the version of the STP being run in the customer sites. For different VECs, however, the links that are blocked may vary, thereby providing a level of load-sharing between the links extending between the Islands and the interconnect fabric.

The IMCP also imposes several new rules. In particular, BPDUs received within an Island whose entire MST Configuration ID matches that of the receiving L2 device are treated as normal, matching BPDUs. Received BPDUs whose Island name matches the Island name of the receiving L2 device, but whose configuration name, revision level and/or configuration digest does not match are treated as Rapid Spanning Tree Protocol (RSTP) BPDUs. This rule allows bridges in the same Island to operate in the same manner as for 802.1S, and maintain connectivity during the reconfiguration of the bridges. Received BPDUs whose Island name does not match the Island name of the L2 device receiving the BPDUs and whose specified Root ID does not match that of the receiving L2 device are ignored, if received from the Inter-Island Trunk. This rule effectively decouples the Islands' Spanning Trees from each other. If received on a bridge port other than an Inter-Island Trunk, the receipt of a BPDU whose Island name does not match the Island name of the L2 device receiving the BPDU causes the receiving bridge to block the respective port for all VLANs and issue an operator alarm. This rule prevents inadvertent connections among Islands other than on an Inter-Island Trunk. In the preferred embodiment, the L2 devices also respond to receiving BPDUs whose Island name does not match the Island name of the L2 device receiving the BPDUs but whose specified Root ID does match that of the receiving L2 device by blocking the respective port for all VLANs and issue an operator alarm. This rule allows an Island to detect inadvertent connections among Islands which are not otherwise detected.

BRIEF DESCRIPTION OF THE DRAWINGS

The invention description below refers to the accompanying drawings, of which:

FIG. 5 is a highly schematic illustration of a Configuration Identifier (ID);

FIG. 6 is a highly schematic illustration of a VLAN Mapping Table;

FIG. 7 is a highly schematic illustration of an Inter-Island Trunk Mapping Table;

DETAILED DESCRIPTION OF AN ILLUSTRATIVE EMBODIMENT

Figure 2:
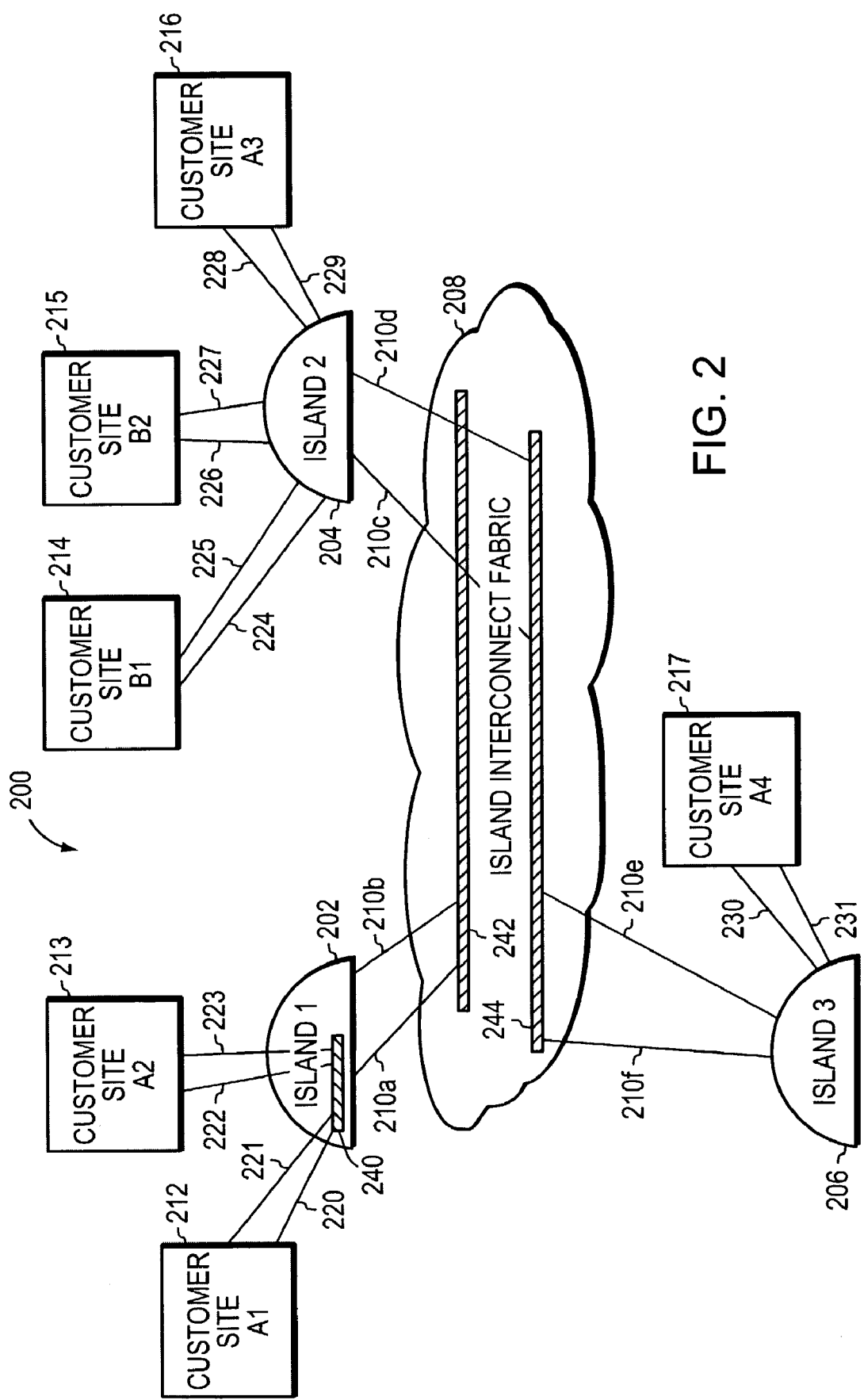
FIG. 2 is a highly schematic illustration of a large Metropolitan Area Network (MAN)

FIG. 2 is a highly schematic illustration of a very large layer 2 (L2) Metropolitan Area Network (MAN) 200 in accordance with the present invention. As used herein, the term "very large MAN" refers to a MAN capable of covering an entire metropolitan area, such as the San Francisco Bay area, Silicon Valley, etc. The MAN 200 includes a plurality of Islands, such as Islands 202, 204 and 206. As described herein, each Island comprises one or more interconnected Layer 2 (L2) intermediate network devices, such as bridges or switches. Typically, each Island is operated by the same MAN Provider, and represents a separate administrative domain. The MAN 200 is organized into different Islands to increase the total number of VLAN designations beyond 4096 that may be supported by the MAN 200. Some or all of the individual Islands, moreover, may be assigned to different administrators.

The Islands are coupled together by an Island Interconnect Fabric 208. Preferably, each Island is coupled to the Island Interconnect Fabric 208 by multiple links, such as Inter-Island links 210a-f. Also, attached to each Island are one or more customer sites, such as personal customers, sites 212-217. In the illustrative embodiment, each customer site comprises a plurality of entities or hosts, such as personal computers, workstations, servers, etc., which are all in the same physical location, and are interconnected to form one or more Local Area Networks (LANs) so that the entities may source or sink data frames to one another. As used herein, the term "same physical location" refers to a single building or a plurality of buildings on a single campus or within the area of roughly a single city block. The LANs at the customer sites may be interconnected by one or more customer operated L2 intermediate network devices such as bridges, switches or routers.

Customer sites 212-217 will typically belong to different organizations, such as organization A and organization B. In particular, organization A includes customer sites 212 (A1), 213 (A2), 216 (A3) and 217 (A4). Organization B includes customer sites 214 (B1), and 215 (B2). Each customer site 212-217 is preferably coupled to at least one Island by a plurality of site links 220-231. As described herein, a customer obtains various services from the MAN 200, such as interconnecting its sites that are geographically remote from each other. In this way, entities located at one customer site can communicate with the entities of another site.

The MAN 200 of FIG. 2 is meant for illustration purposes only and is not meant to limit the invention. Indeed, MAN 200 will typically include many more customer sites, e.g., thousands.

Figure 3:
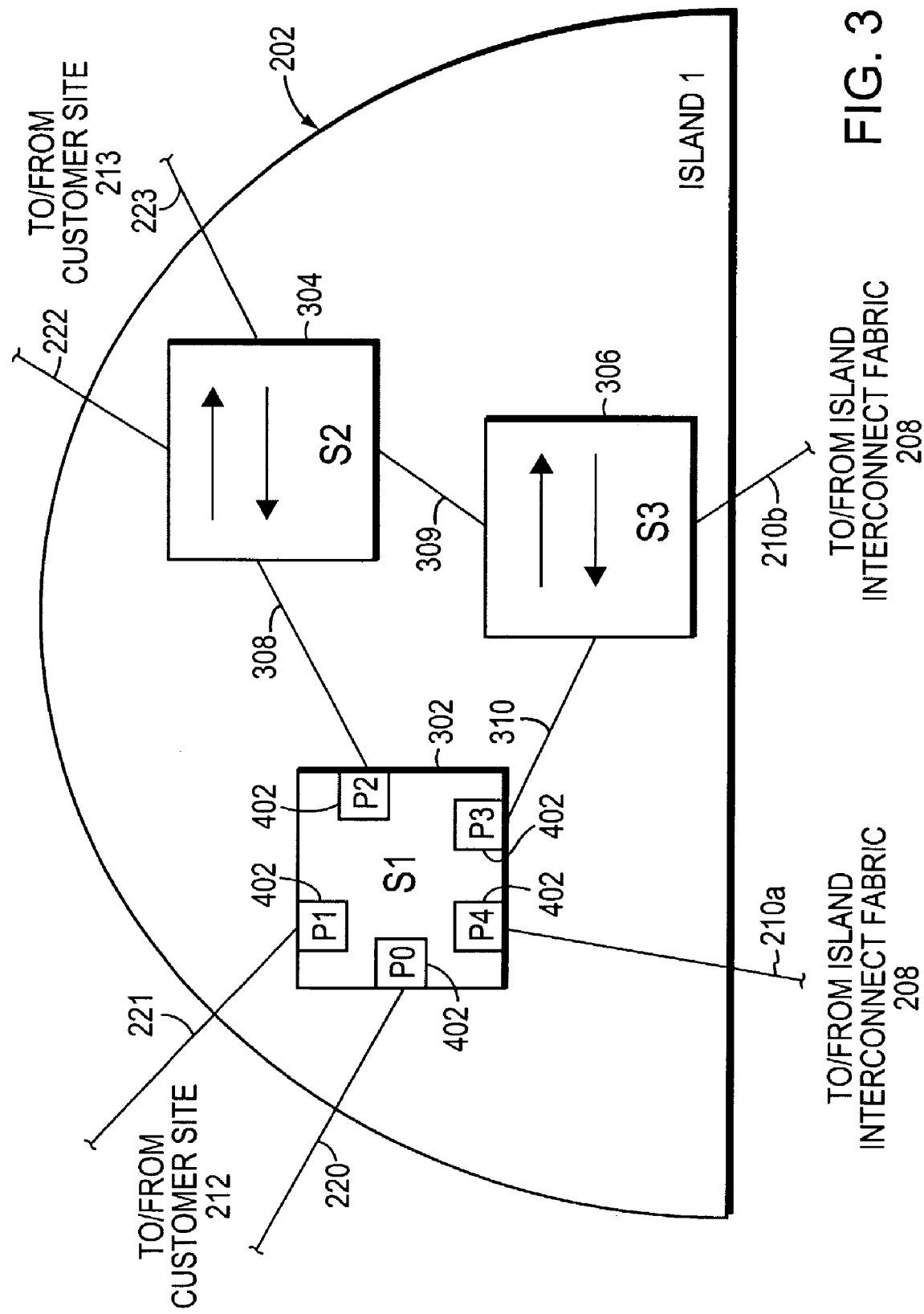
FIG. 3 is a highly schematic illustration of an Island of the MAN of FIG. 2.

FIG. 3 is a highly schematic illustration of Island 202. Island 202 includes a plurality of L2 intermediate network devices, such as switches (S) 302, 304 and 306. Each switch 302, 304 and 306 includes a plurality of ports (P) 402 at least some of which are utilized to connect the switches to the customer sites. Other switch ports 402 are coupled to intra-Island links 308-310 extending between the switches 302, 304 and 306. Links 308-310 may be point-to-point links or shared media links that carry network messages, such as frames, among the switches. Each switch 302-306, moreover, preferably identifies its own ports 402, e.g., by port numbers, such as port zero (P0), port one (P1), port two (P2), port three (P3), etc. Switches 302-306 are thus able to associate specific ports with the customer sites and/or other switches coupled thereto.

At least some of the switches of each Island may be classified into different categories. For example, each Island has one or more Provider Edge switches, which are disposed at the boundary between the Island and one or more customer sites. The Provider Edge switches are directly coupled to the customer sites. Each Island also includes one or more Island Boundary Bridges that connect the Island to the Island Interconnect Fabric 208. With reference to FIG. 3, switch 304 is a Provider Edge Bridge, switch 306 is an Island Boundary Bridge and switch 302 is both a Provider Edge Bridge and an Island Boundary Bridge.

Suitable intermediate network device platforms for use with the present invention include, but are not limited to, the commercially available Catalyst 4000 and 6000 series of switches from Cisco Systems, Inc. of San Jose, Calif.

Figure 4:
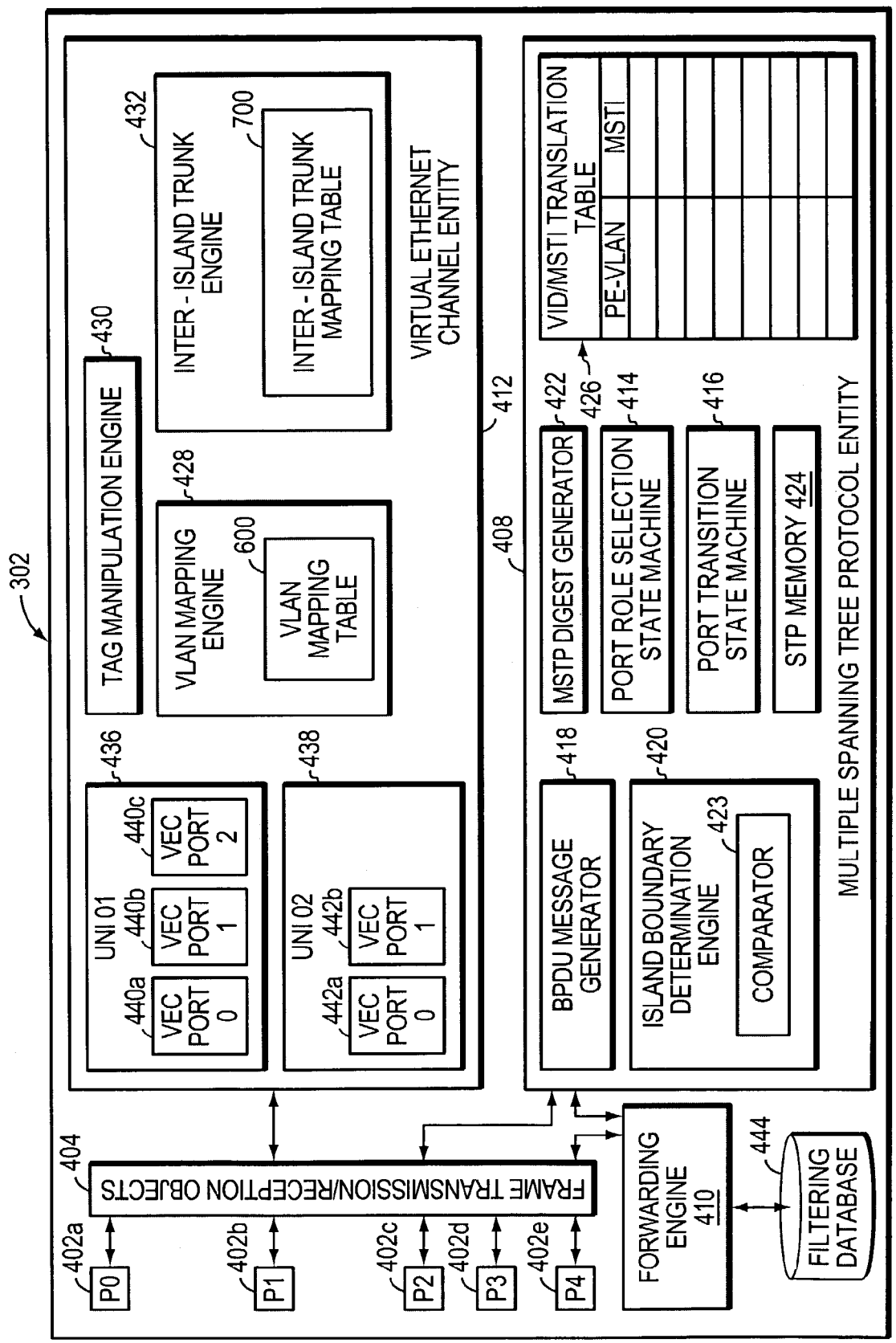
FIG. 4 is a partial, functional diagram of a Layer 2 (L2) device of the Island of FIG. 3.

FIG. 4 is a partial block diagram of MAN Provider switch, such as switch 302. Switch 302 includes a plurality of ports 402a-402e each of which is preferably identified by a number (e.g., P0-P4). One or more frame transmission and reception objects, designated generally 404, are associated with the ports 402a-d such that network messages, including frames, received at a given port, e.g., P3, may be captured, and frames to be transmitted by switch 302 may be delivered to the appropriate port, e.g., P1, for transmission. Frame reception and transmission objects 404 are preferably message storage structures, such as priority queues. In the illustrated embodiment, switch 302 includes transmitting and receiving circuitry, including one or more line cards and/or network interface cards (NICs) establishing ports for the exchange of network messages, one or more supervisor cards having central processing units (CPUs) and/or microprocessors and associated memory devices for performing computations and storing the results therefrom and one or more bus structures.

Switch 302 has a plurality of protocol entities, including at least one Multiple Spanning Tree Protocol (MSTP) entity 408, at least one forwarding engine 410, and a Virtual Ethernet Channel (VEC) entity 412. The MSTP entity 408 preferably comprises a plurality of subcomponents, including a port role selection state machine 414, a port transition state machine 416, a bridge protocol data unit (BPDU) message generator 418, an Island Boundary Determination engine 420, and an MSTP Digest Generator 422. Island Boundary Determination engine 420 preferably includes one or more comparators, such as comparator 423. The MSTP entity 408 preferably operates in accordance with the IEEE 802.1s Multiple Spanning Tree Protocol (MSTP) draft supplement to the 802.1Q specification standard, the current draft (IEEE Draft P802.1s/D13™—Jun. 13, 2002) of which is hereby incorporated by reference in its entirety, as modified by the Inter-MAN Control Protocol (IMCP) described herein. The MSTP entity 408 includes or is in communicating relationship with a memory device or structure, such as STP memory 424, which may be a volatile or non-volatile random access memory (RAM) or some other memory device. Memory 424 is preferably organized to include a plurality of records or cells (not shown) for storing spanning tree related information or parameters such as the switch's Configuration ID, numeric bridge identifier (ID), the assigned path cost for each port 402a-e for each MSTI, the current or "best" spanning tree information for each port P0-P4 for each MSTI, etc. In addition to memory 424, the STP entity 408 further includes a VLAN ID (VID) to Multiple Spanning Tree Instance (MSTI) translation table 426 configured to store the mappings of VLANs to MSTIs.

The VEC entity 412 comprises a VLAN mapping engine 428, a tag manipulation engine 430, and an Inter-Island Trunk engine 432. The VLAN mapping engine 428 includes one or more VLAN mapping tables 600 that maps Customer Equipment VLAN IDs (CE-VLANs) to Provider Equipment VLAN IDs (PE-VLANs) preferably on a per port basis. In an alternative embodiment, there may be a separate VLAN mapping engine and a separate VLAN mapping table for each port (or some number of ports), and each VLAN mapping table may be configured with a different mapping of CE-VLANs to PE-VLANs.

The Inter-Island Trunk Mapping engine 432 has an Inter-Island Trunk Mapping table 700 that maps PE-VLAN IDs to VEC Identifiers (IDs). VEC IDs are preferably appended to frames prior to transmission into the Island Interconnect Fabric 208. To provide connectivity between different customer sites, VEC entity 412 is configured to establish one or more User Network Interface (UNIs), such as UNI 01 also designated by reference numeral 436 and UNI 02 also designated by reference numeral 438. As described herein, each UNI represents the termination point of one or more VECs, and may thus be considered to define one or more logical VEC ports. UNI 436, for example, has three VEC ports 440a-c. UNI 438 has two VEC ports 442a-b.

The forwarding engine 410 is in communicating relationship with the frame transmission and reception objects 404 and is coupled to at least one filtering database 444 that stores address information corresponding to the entities of the MAN 200 (FIG. 2). Specifically, filtering database 444 has a plurality of records (not shown) each containing a plurality of cells, including a destination address cell, a destination port cell, a filtering database ID (FID) cell and a corresponding timer cell. Each record in the filtering database 444 preferably corresponds to a particular network entity. The FID, which is derived from the message's PE-VLAN ID, allows a given destination MAC address to correspond to the same or to different MAC addresses for different PE-VLAN IDs. The forwarding engine 410 is configured to switch or bridge network messages, such as packets and/or frames, from a source port 402 to one or more destinations ports 402 depending on information contained in the forwarding database 428 and also on the spanning tree port states of the respective ports 402 as managed by MSTP entity 408. The forwarding engine 410 is also in communicating relationship with the MSTP entity 408 and relays MSTP-related messages received at ports 402 thereto. Forwarding engine 410 may also be in communicating relationship with VEC entity 412.

It will be understood by those skilled in the art that MSTP entity 408, forwarding engine 410 and VEC entity 412 may each comprise registers and combinational logic configured and arranged to produce sequential logic circuits. In the illustrated embodiment, MSTP entity 408, forwarding engine 410 and VEC entity 412 are preferably a combination of software modules or libraries containing program instructions pertaining to the methods described herein, which are executable by one or more processing elements (not shown) of switch 302, and hardware elements. Other computer readable media may also be used to store and execute these program instructions. Nonetheless, those skilled in the art will recognize that various combinations of software and hardware, including firmware, may be utilized to implement the present invention.

Formation of Islands as Separate Administrative Domains

Initially, the MAN Provider organizes its equipment, i.e., L2 switches 302-306, into a plurality of Islands. In the preferred embodiment, the switches are organized into Islands by configuring their MST Configuration IDs in a specific manner. More specifically, the MAN Provider first decides which of its switches should be organized into a given Island. The MAN Provider then configures the MST Configuration ID for every switch within the given Island to be the same. FIG. 5 is a highly schematic illustration of an MST Configuration ID 500 configured in accordance with the present invention. The MST Configuration ID 500 has a 32-byte Island Name field 502, a 32-byte Configuration Name field 503, a 2-byte Revision Level field 504 and a 2-byte Configuration Digest field 506, which is preferably formed by applying the MD-5 Checksum Algorithm to the contents of the VID/MSTI Translation Table 426 (FIG. 4). For each switch in the given Island, the MAN Provider configures the Island Name field 502, the Configuration Name field 503 and the Revision Level field 504 of each switch's MST Configuration ID 500 with the same values. The MAN Provider also establishes the same mappings of PE-VLANs to MSTIs with the given Island. Thus, each switch in the given Island will generate the same digest value. The switches store the MST Configuration IDs selected by the MAN Provider at their STP memories 424.

In the preferred embodiment, the Island Name field 502 is 2-bytes or longer, the Configuration Name field 503 is 32-bytes, the Revision Level field 504 is 2-bytes and the Configuration Digest field 506 is 2-bytes. In an alternative embodiment, the Island Name field 502 and Configuration Name field 503 are a combined 32-bytes and the two values may be separated by some specially selected character, such as the "#" symbol.

The configuration of switches 302-306 may be performed locally through a Command Line Interface (CLI) provided at the switch or remotely through the well-known Simple Network Management Protocol (SNMP).

For example, switches 302, 304 and 306 (FIG. 3), which are all disposed in Island 202, are each be configured with the same Island name, e.g., "ISLAND0001", the same configuration name, e.g., "MAN4452" and the same revision level, e.g., "0001". Switches 302, 304 and 306 will additionally be configured to have the same mapping of PE-VLANs to MSTP Instance IDs. The switches disposed in Island 204 (FIG. 2), on the other hand, will each be configured with a different Island name, e.g., "ISLAND0002". They may each be configured with the same or a different configuration name and/or revision level and will typically be configured with a different mapping of PE-VLANs to MSTP Instance IDs.

When the MAN Provider initializes and runs its switches, they will automatically, i.e., without manual intervention, segregate themselves into the desired Islands as part of their execution of the MSTP. More specifically, because switches 302, 304 and 306 have each been configured with the same Island names, the same configuration names, the same revision level numbers and the same mapping of PE-VLANs to MSTP Instance IDs, they will conclude that they are all part of the same MSTP Region or, in this case, the same Island.

As described herein, the UNIs are configured to treat BPDU messages received from a customer site in one of two ways. Specifically, the UNIs either discard BPDU messages received from the customer site or treat the received BPDU messages as data frames and tunnel them through the Island so that they may be received by other customer sites. Similarly, the UNIs do not send BPDUs generated by the Provider Edge Bridges into the customer sites. Accordingly, the MAN Provider's switches 302, 304 and 306 do not cooperate in the calculation of any active topology(ies) with the intermediate network devices located in the customer sites.

Within each Island, moreover, the MAN Provider's switches will establish an active topology for each MSTP Instance defined within the respective Island. Suppose, for example, that the MAN Provider defined ten MSTP Instances within Island 202 and assigned at least one PE-VLAN to each MSTP Instance. Switches 302, 304 and 306, as part of their execution of the MSTP, will establish an Internal Spanning Tree (IST) as well as ten loop-free, active topologies within Island 202.

Linking Multiple Customer Sites Through One or More Islands

Suppose the customer operating sites 212, 213, 216 and 217 (FIG. 2) wishes to interconnect these sites. More specifically, suppose that the customer wishes to connect site 212 with site 213, site 212 with site 216 and site 216 with site 217. The customer preferably contacts the MAN Provider and requests such services. The MAN Provider, in turn, configures its equipment, i.e., the switches disposed in Islands 202, 204 and 206 to establish the desired connections.

In accordance with the present invention, the MAN Provider provides the requested service by establishing a Virtual Ethernet Connection (VEC) between each of the identified customer sites. A VEC simulates a physical Ethernet link or an Ethernet bridged LAN extending between two or more customer sites. As described herein, within each Island, there is a one-to-one correspondence between a VEC and a PE-VLAN ID.

As shown by the network illustrated in FIG. 2, customer sites 212 and 213 are both connected to the same Island, i.e., to Island 202. Customer sites 212 and 216, however, are each connected to different Islands, i.e., to Islands 202 and 204, respectively. Similarly, customer sites 216 and 217 are each connected to a different Island, i.e., to Islands 204 and 206, respectively. To provide the requested connectivity, the MAN Provider, among other things, preferably establishes a first VEC that connects customer sites 212 and 213, a second VEC that connects customers sites 212 and 216, and a third VEC that connects sites 216 and 217. The first VEC resides entirely within Island 202. Accordingly, the MAN Provider simply needs to establish an Intra-Island Link 240 within Island 202 for use by the first VEC.

It should be understood that an Intra-Island Link is simply a logical representation of an interconnection between two customer sites across a single Island that, in the preferred embodiment, is a VLAN operating in accordance with the IEEE Std. 802.1Q-1998 specification standard. The Intra-Island Link may additionally or alternatively employ the ISL protocol from Cisco Systems, Inc.

The second VEC, on the other hand, must span multiple Islands, i.e., Islands 202 and 204. Accordingly, the MAN Provider must establish an Inter-Island Trunk 242 that connects Islands 202 and 204 for use by the second VEC. The third VEC similarly spans multiple Islands and thus it too requires access to an Inter-Island Trunk 244 that couples Islands 204 and 206.

Intra-Island Links

Creation of the first VEC which couples customer sites 212 and 213 preferably proceeds as follows. Within Provider Edge switch 302, which connects to customer site 212, the MAN Provider establishes a User Network Interface (UNI), such as UNI 438 (FIG. 4). A UNI is a logical interface between a customer site and the MAN Provider's network, e.g., an Island. Each UNI established by the MAN Provider has one or more VEC ports each of which represents a termination or end point of a corresponding VEC that has been created by the MAN Provider. Within UNI 438, VEC port 442a may be assigned to the first VEC. The MAN Provider then assigns a MAN Provider Equipment VLAN ID (PE-VLAN ID) to the first VEC. As described herein, the PE-VLAN ID is a VLAN designation that is appended to and thus identifies frames travelling through the respective Island, e.g., Island 202, that correspond to a respective VEC, e.g., the first VEC which connects customers sites 212 and 213. The PE-VLAN ID for the first VEC may be "4011".

The customer selects a Customer Equipment VLAN ID (CE-VLAN ID) to be used by the customer when communicating between customer sites 212 and 213 coupled by Island 202. The CE-VLAN ID, which may be "0014", is typically selected based on the needs of the customer's own sites and its networking equipment. The customer configures its own equipment so that all network messages, e.g., Ethernet frames, created in one of the sites, e.g., site 212, that are to be delivered to the other site, e.g., site 213, are tagged with the chosen CE-VLAN ID. The MAN Provider learns of the selection and configures the VEC entities 412 of the switches that are at the Island's boundaries and that connect to the two customer sites, i.e., switches 302 and 304 of Island 202, to map the chosen CE-VLAN ID, i.e., "0014", to the respective PE-VLAN ID, i.e., "4011". In particular, the MAN Provider configures the Customer VLAN mapping table 600 of the VEC entities 412.

FIG. 6 is a highly schematic illustration of VLAN mapping table 600 of switch 302. Table 600 is organized at least logically as a table or array having a plurality of columns and rows whose intersections define cells or records for storing information. Table 600 preferably has a CE-VLAN ID column 602, a VEC column 604, a PE-VLAN ID column 606, a UNI column 608, and a VEC Port column 610. Table 600 also has a plurality of rows 614a-c. The MAN Provider preferably assigns a free row, e.g., row 614a, to the first VEC. At row 614a, the MAN Provider loads the chosen CE-VLAN ID, i.e., "0014", into the cell corresponding to column 602, a VEC ID, e.g., "001", into the cell corresponding to column 604, the PE-VLAN ID, e.g., "4011", that has been assigned to the chosen CE-VLAN ID into the cell corresponding to column 606, the particular UNI assigned to this VEC, i.e., UNI 01, into the cell corresponding to column 608, and the particular VEC Port, i.e., VEC Port 0, into the cell corresponding to column 610. The MAN Provider similarly configures the VLAN mapping table 600 of switch 304 which is at the boundary of Island 202 and customer site 213.

End stations in the two sites 212 and 213 can now communicate with each other by using the chosen CE-VLAN ID. Suppose, for example, that a workstation disposed in site 212 wishes to communicate with a workstation in site 213. The workstation in site 212 encodes its message into one or more Ethernet frames, and in the frames' VLAN ID field inserts the CE-VLAN ID chosen by the customer, i.e., "0014". These VLAN ID tagged frames are received by switch 302 within Island 202, which is at the boundary to customer site 212. The VLAN ID tagged frames are initially provided to the switch's VEC entity 412, which accesses its VLAN mapping table 600 to perform a look-up. Specifically, the VEC entity 412 searches table 600 to determine to which VEC the received frames belong. Row 614a of the VLAN mapping table 600 indicates that CE-VLAN ID "0014" corresponds to VEC "001" and that this VEC has been mapped to PE-VLAN ID "4011".

In one embodiment of the present invention, the VEC entity's tag manipulation engine 430 loads the frames' VLAN ID fields with PE-VLAN ID "4011", replacing CE-VLAN ID "0014". Alternatively, the tag manipulation engine 430 may add a new VLAN Identifier (VID) field (not shown) to the message and load this new VID field with the respective PE-VLAN ID, i.e., "4011", leaving the original VID field (carrying the CE-VLAN ID) unmodified.

The frames, which are now tagged with PE-VLAN ID "4011", are then provided to the UNI for transmission via the VEC Port that has been established for this VEC. The frames travel on the Intra-Island Link 240 established for the VEC and are received at switch 304. As indicated above, the Intra-Island Link 240 basically corresponds to a portion of the MSTP Instance or active topology defined within Island 202 to which PE-VLAN ID "4011" has been mapped. To the extent the frames are forwarded by any intermediary switches or bridges disposed in-between switches 302 and 304, these intermediary switches preferably do not modify the frames. That is, the frames do not undergo any further changes to their VLAN tags by switches that are forwarding the frames to other switches within Island 202.

At switch 304, the frames are received on a VEC Port that represents the other end of the VEC created to interconnect customer sites 212 and 213. As the frames are about to be transmitted from the UNI at switch 304, i.e., they are about to be transmitted outside of Island 202, they are subjected to another transformation. More specifically, the frames are provided to the VEC entity 412 of switch 304, which performs a look-up on its VLAN mapping table 600. Here, VEC entity 412 searches table 600 based on the PE-VLAN ID with which the frames have been tagged. The VEC entity 412 determines that PE-VLAN ID "4011" corresponds to CE-VLAN ID "0014". Accordingly, the tag manipulation engine 430 loads the frames' VLAN ID fields with CE-VLAN ID "0014", replacing PE-VLAN ID "4011". The frames, which have been restored with their original VLAN IDs, are then sent from switch 302 into customer site 213. The frames are then delivered to the targeted workstation based on the destination address carried by the frames.

In the embodiment where the new VID field is added to the frame upon receipt in the Island 202, the tag manipulation engine 430 at switch 304 strips off the new VID field before sending the frame into customer site 213.

Communication from the workstation in customer site 212 to site 213 works in a similar manner. Specifically, at switch 304, the frames which are tagged with the assigned CE-VLAN ID are modified by loading the PE-VLAN ID that is assigned to this CE-VLAN ID into the frames' VLAN ID field. The frames then travel along the Intra-Island Link 240 within Island 202 to switch 302 which is at the boundary with customer site 212. The frames are then restored with their original CE-VLAN IDs and transmitted into customer site 212 for delivery to the targeted workstation of customer site 212.

It should be understood that different CE-VLAN IDs could have been selected within customer sites 212 and 213 for use with the first VEC. In this case, the VLAN Mapping table 600 is preferably configured to specify both CE-VLAN IDs.

Inter-Island Trunks

Creation of the second VEC coupling customer sites 212 and 216 preferably proceeds as follows. Within switch 302, which connects to customer site 212, the MAN Provider either establishes a new UNI or assigns an existing UNI to the second VEC. As UNI 438 is already assigned to customer site 212 for purposes of the first VEC, the MAN Provider may re-use this existing UNI 438 for the second VEC. Nonetheless, a new VEC Port at UNI 438, such as VEC Port 442b, must be provided for the second VEC as each VEC must have its own VEC port. The MAN Provider then selects and assigns a PE-VLAN ID to the second VEC for use within Island 202. The selected PE-VLAN ID will be used to identify frames travelling through the Island 202 that correspond to the second VEC. Suppose that the MAN Provider selects PE-VLAN ID "4027" for the second VEC within Island 202.

A CE-VLAN ID is chosen by the customer for use by network entities disposed in customer site 212 when communicating with network entities disposed in customer site 216. Suppose the customer chooses CE-VLAN ID "0038" for use in customer site 212. The customer configures its own networking equipment disposed within site 212 so that all network messages, e.g., Ethernet frames, created within that site and destined for network entities in site 216 are tagged with CE-VLAN ID "0038". The customer also notifies the MAN Provider of the selected CE-VLAN ID. In response, the MAN Provider then configures the VEC entity 412 of switch 302 which is at the boundary between Island 202 and customer site 212 to map frames tagged with the chosen CE-VLAN ID, i.e., "0038", to the selected PE-VLAN ID, i.e., "4027" that is being mapped thereto. In particular, the MAN Provider configures the VLAN mapping table 600 of the VEC entity 412 at switch 302.

More specifically, the MAN Provider assigns a free row, e.g., row 614b, to the second VEC. At row 614b, the MAN Provider loads the chosen CE-VLAN ID, i.e., "0038", into the cell corresponding to column 602, a VEC ID, e.g., "002", into the cell corresponding to column 604, and the corresponding PE-VLAN ID, e.g., "4027", selected by the MAN Provider into the cell corresponding to column 606. The MAN Provider also loads the particular UNI assigned to this VEC, i.e., UNI 01, into the cell corresponding to column 608, and the selected VEC Port, i.e., VEC Port 1, into the cell corresponding to column 610.

Within Island 204, which connects to customer site 216, the MAN Provider establishes a UNI that gives network entities in customer site 216 access to the second VEC. The UNI is preferably provided at the Provider Edge switch(es) at the boundary between Island 204 and site 216, i.e., the switch(es) that are directly connected to customer site 216, i.e., via site links 228 and/or 229. The MAN Provider also establishes a VEC port within the UNI to terminate the second VEC at Island 204. The MAN Provider then selects and assigns a PE-VLAN ID to the second VEC for use within Island 204. The selected PE-VLAN ID will be used to identify frames travelling within Island 204 that correspond to the second VEC. Notably, the selected PE-VLAN ID for use in Island 204 may be different from PE-VLAN ID "4027" which was selected for use in Island 202. Indeed, suppose that the MAN Provider selects PE-VLAN ID "4017" for the second VEC within Island 204.

As above, the customer chooses a CE-VLAN ID based on its own needs and the capabilities of its networking equipment to be used by network entities disposed in customer site 216 when communicating with network entities disposed in customer site 212. The CE-VLAN ID that is chosen for use in site 216 may be the same or may differ from the one selected for use in customer site 212. Suppose the customer selects CE-VLAN ID "0018" for use in customer site 216. The customer configures its own internetworking equipment disposed within site 216 so that all network messages, e.g., Ethernet frames, created within that site and destined for network entities in site 212 are tagged with CE-VLAN ID "0018". The customer also notifies the MAN Provider of the selected CE-VLAN ID. The MAN Provider then configures the VEC entity 412 of the switch disposed in Island 204 that is directly connected to customer site 216 to map frames tagged with CE-VLAN ID "0018" to the PE-VLAN ID selected for use in Island 204, i.e., "4017". In particular, the MAN Provider configures the VLAN mapping table 600 of the VEC entity 412 at the Provider Edge switch(es) of Island 204 relative to customer site 216.

Row 614c (FIG. 6) illustrates how the VLAN Mapping Table 600 at the respective Provider Edge switch(es) of Island 204 are configured. More specifically, the MAN Provider loads the chosen CE-VLAN ID, i.e., "0018", into the cell corresponding to column 602, the VEC ID, e.g., "002", into the cell corresponding to column 604, and the corresponding PE-VLAN ID, e.g., "4017", that has been mapped to the chosen CE-VLAN ID into the cell corresponding to column 606. The MAN Provider also loads the UNI assigned to this VEC, e.g., UNI 00, into the cell corresponding to column 608, and the VEC Port, e.g., VEC Port 0, into the cell corresponding to column 610.

As shown, this second VEC passes through two separate Islands 202 and 204 in order to provide connectivity between the two selected customer sites 212 and 216. Accordingly, the second VEC utilizes an Inter-Island Trunk 242, which extends through the Island Interconnect Fabric 208 and connects the two Islands 202 and 204. In the illustrative embodiment, the Inter-Island Trunks operate as shared-medium Ethernet or bridged LAN in connectivity, and are established by Multiple Protocol Label Switching (MPLS) virtual private networks (VPNs), Packet Ring, Asynchronous Transfer Mode (ATM) Emulated LAN, or other such technologies. The MPLS VPNs are formed within the Island Interconnect Fabric 208. Notably, each VEC that crosses the Island Interconnect Fabric 208 must only use a single Inter-Island Trunk. Nonetheless, multiple VECs may use the same Inter-Island Trunk.

In the illustrative embodiment, the Island Interconnect Fabric 208 may be the well-known Internet.

As indicated above, each of the MAN Provider's Islands includes at least one Island Boundary Bridge which is the switch or bridge that provides direct connectivity from the Island to the Island Interconnect Fabric 208, and thus to the other Islands of the MAN Provider's Metropolitan Area Network. At Island 202, for example, switches 302 and 306 are both Island Boundary Bridges because they provide direct connectivity to the Island Interconnect Fabric 208 via Inter-Island links 210a and 210b, respectively. For those VECs, such as the second VEC, that utilize an Inter-Island Trunk, the MAN Provider must configure the VEC entities located in the Island Boundary Bridges of the two (or more) Islands being interconnected to modify the frames for transmission across the Inter-Island Trunk. First, the MAN Provider configures the Inter-Island Trunk Mapping Table 700 of the Island Boundary Bridges.

FIG. 7 is a highly schematic illustration of an Inter-Island Trunk Mapping Table 700. Table 700 is organized at least logically as a table or array having a plurality of columns and rows whose intersections define cells or records for storing information. Table 700 preferably has a PE-VLAN ID column 702, a VEC column 704, and an Inter-Island Trunk ID column 706. Table 700 also has a plurality of rows 710a-c. At the Island Boundary Bridges in Island 202, the MAN Provider preferably assigns a free row, e.g., row 710a, to the second VEC. At row 710a, the MAN Provider loads the selected PE-VLAN ID for Island 202, i.e., "4027", into the cell corresponding to column 702, and a VEC ID selected for the second VEC, e.g., "002", into the cell corresponding to column 704. The MAN Provider loads the cell corresponding to column 706 with an Inter-Island Trunk ID corresponding to the tag or label that is to be appended to network messages traversing the Island Interconnect Fabric 208. The Inter-Island Trunk ID, which may comprise more than one label or tag, is selected depending on the particular protocol(s) used to interconnect the Islands. Assuming that the MPLS protocol and, more specifically, Emulated VLAN over MPLS (EVoMPLS) is the protocol being used, a unique MPLS label, e.g., "6042", is selected for the second VEC's Inter-Island Trunk.

The MAN Provider also configures the Inter-Island Trunk Mapping Table 700 at the Island Boundary Bridge(s) of Island 204. Row 710b (FIG. 7) illustrates how this entry would be configured. Specifically, PE-VLAN ID "4017" which was selected for use in Island 204 is loaded into the cell corresponding to column 702, the common VEC ID, i.e., "002", is loaded into the cell corresponding to column 704, and the common Inter-Island Trunk ID is loaded into the cell corresponding to column 706.

Second, the MAN Provider configures the Island Boundary Bridges to tag frames for transmission over the Inter-Island Trunk and to capture and process frames received over the Inter-Island Trunk. In particular, when switch 302 of Island 202 receives a frame tagged with CE-VLAN ID "0038" which corresponds to the second VEC, it uses the CE-VLAN ID to perform a look-up on its VLAN Mapping Table 600 to derive the corresponding PE-VLAN ID, i.e., "4027". Switch 302 then replaces the CE-VLAN ID with corresponding PE-VLAN ID and forwards the frame into Island 202 (assuming the VEC is utilizing Island link 210b at switch 306). The frame is received at switch 306, which encapsulates the received frame for transmission across the Island Interconnect Fabric 208.

Figure 8:
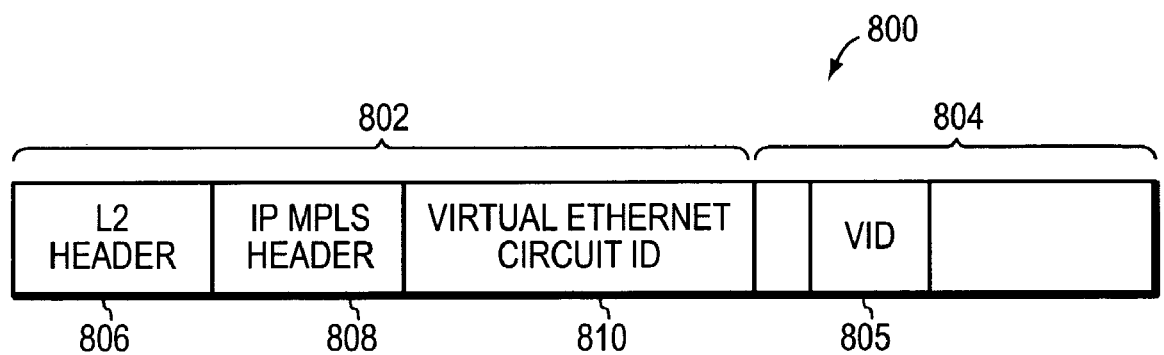
FIG. 8 is a highly schematic illustration of a labeled network message format.

FIG. 8 is a highly schematic illustration of an encapsulated frame 800 for transmission across Island Interconnect Fabric 208. The encapsulated frame 800 includes an MPLS label stack 802 appended to the original Ethernet frame 804. As indicated above, if the PE-VLAN ID was added to the CE-VLAN ID at the UNI, instead of replacing it, then the Ethernet frame 804 may include a VLAN ID (VID) field 805, corresponding to the CE-VLAN ID. The MPLS label stack 802 includes a Layer 2 (L2) header 806 that corresponds to the medium employed by the Island Interconnect Fabric 208, an IP/MPLS header 808 and a Virtual Ethernet Circuit ID field 810. A suitable encapsulation scheme for use with the present invention is described in Request for Comments (RFC) 2684 *Multiprotocol Encapsulation over ATM Adaptation Layer* 5 (September 1999 ). The Island Boundary Bridge performs a look-up on its Inter-Island Trunk Mapping Table 700 to derive the Virtual Ethernet Circuit ID. Specifically, the Island Boundary Bridge locates the Inter-Island Trunk ID that corresponds to the PE-VLAN ID with which the received Ethernet frame is tagged. Here, the PE-VLAN ID is "4027" and the matching Inter-Island Trunk ID is "6042". This retrieved value is loaded into the Virtual Ethernet Circuit ID field 810.

The encapsulated frame is then transmitted onto the Island Interconnect Fabric 208. The Inter-Island Trunk 242 delivers the frame to all ports within Islands 202-206 that are members of the same VEC as specified by the Virtual Ethernet Circuit ID (other than the port on which the frame was sent). The encapsulated frame is thus received at the Island Boundary Bridge(es) of Island 204. The Island Boundary Bridge of Island 204 utilizes the value loaded in the encapsulated frame's Virtual Ethernet Circuit ID field to derive the corresponding PE-VLAN ID for use in Island 204. Here, the Virtual Ethernet Circuit ID is "6042" and the matching PE-VLAN ID from row 710*b* (FIG. 7) is thus "4017". The Island Boundary Bridge also determines whether it can accept the received frame based on the spanning tree state of the port on which it was received. If the port is in the blocking spanning tree port state for VLAN "4017", the frame is discarded. In this case, there would be another Island Boundary Port at Island 204 that is in the forwarding spanning tree port state for VLAN "4017", and could thus accept the frame.

The Island Boundary Bridge of Island 204 at which the frame is accepted strips off the MPLS label stack and recovers the original Ethernet frame 804. In the frame's VLAN ID field 805, the Island Boundary Bridge loads the PE-VLAN ID for this VEC, i.e., "4017". The Island Boundary Bridge then transmits the frame within Island 204. The frame is received at the Provider Edge bridge of Island 204 for customer site 216. The Provider Edge bridge performs a look-up on its VLAN Mapping Table 600 using the frame's PE-VLAN ID to derive the corresponding CE-VLAN ID. Here, the PE-VLAN ID is "4017" and thus the matching CE-VLAN ID is "0018". Accordingly, the Provider Edge bridge loads the CE-VLAN ID into the Ethernet frame replacing the PE-VLAN ID. The frame, tagged with the CE-VLAN ID, is then transmitted by the Provider Edge switch of Island 204 into customer site 216 for receipt by the target network entity.

Preventing the Formation of Loops

As shown in FIG. 2, each customer site is preferably coupled to its respective Island by multiple links. In addition, each Island is connected to the Island Interconnect Fabric 208 by multiple links. In order to take advantage of the fast convergence time of RSTP (as opposed to the 802.1D spanning tree protocol), each Island preferably has at most two connections or links to any one Inter-Island Trunk. The use of multiple links prevents any customer site and/or Island from losing connectivity should any consistent link fail. The presence of multiple links, however, can result in the formation of loops as both the customer sites and the Islands are operating at layer 2 (L2) as opposed to some higher layer of the communication stack. Specifically, because the Provider Edge Bridges do not cooperate with the customer networks in the execution of any Spanning Tree Protocol, each UNI transitions to the forwarding spanning tree state for each PE-VLAN ID defined in the Island. Thus, the UNIs do not discard any frames received from the customer networks, unless a CE-VLAN ID maps to no PE-VLAN ID in the VLAN Mapping Table 600.

Loops formed by the presence of redundant links between a customer site and an Island are preferably severed by having the customer site block one or more of its ports. This may be achieved by treating BPDUs generated in a customer site exactly the same as data frames. More specifically, each UNI at the Provider Edge Bridges may be configured to examine the destination MAC address of frames received from the respective customer site to determine whether the address matches a destination MAC address utilized by BPDU messages. If so, the frame is recognized as such by the Provider Edge Bridge. In response, the Provider Edge Bridge preferably transports the BPDU message, like a data frame, through the Provider network. In order to prevent the customer generated BPDU from being mistaken by the provider's switches for a provider generated BPDU, the customer BPDU may be altered on ingress to the provider network, and restored on egress, for example by altering its destination MAC address. When the BPDU is received back at the same or another customer site, it is processed in accordance with the particular Spanning Tree Protocol operating in the customer site in a conventional manner. As a result, the Provider network will appear to the customer site simply as a shared-medium, and the customer's internetworking equipment, through operation of a Spanning Tree Protocol (STP), will sever the loop by blocking either a port facing one of the UNIs or a port that is internal to the customer site.

Alternatively, the Provider Edge Bridges may be configured to simply discard BPDUs that are received at the UNI. In this case, a loop may exist, resulting in the rate of frames entering the Island from the customer site continuing to increase. If the Island monitors the rate of data being received from the customer site, then a warning may be triggered if this rate exceeds some threshold.

To avoid the formation of loops resulting from the presence of multiple connections between a given Island and the Island Interconnect Fabric 208, the Islands preferably run a new protocol, the Inter-MAN Control Protocol (IMCP) in accordance with the present invention. The IMCP, which represents a modified version of MSTP, specifies special rules and methods to efficiently prevent the formation of loops among the Islands of a MAN Provider's Metropolitan Area Network. This modified version blocks the formation of loops and yet avoids having to run a single instance of the spanning tree protocol across the entire MAN, i.e., across all of the Islands. Indeed, because there may be hundreds of Islands (if not more) and because the total-number of VECs defined within the Islands may be much greater than the 4096 permitted by the IEEE Std. 802.1Q-1998 and IEEE Draft P802.1s/D13 specification standards, it would be impractical if not impossible to run a spanning tree instance across them.

As indicated above, the MAN Provider configures the VID/MSTI Translation Table 426 of the switches in each Island so as to associate each PE-VLAN ID with exactly one MSTI. Within a given Island, the switches within the given Island will typically support a plurality of MSTIs and one CIST. Traffic corresponding to different PE-VLAN IDs can thus be load-shared among the different active topologies defined by the MSTIs and the CIST.

For redundancy (and load-sharing) purposes, each Island preferably has at most two connections to each Inter-Island Trunk. For example, an Island may have a single Inter-Island Bridge with two connections to an Inter-Island Trunk and/or two Inter-Island Bridges each having one connection to that Inter-Island Trunk.

Figure 1:
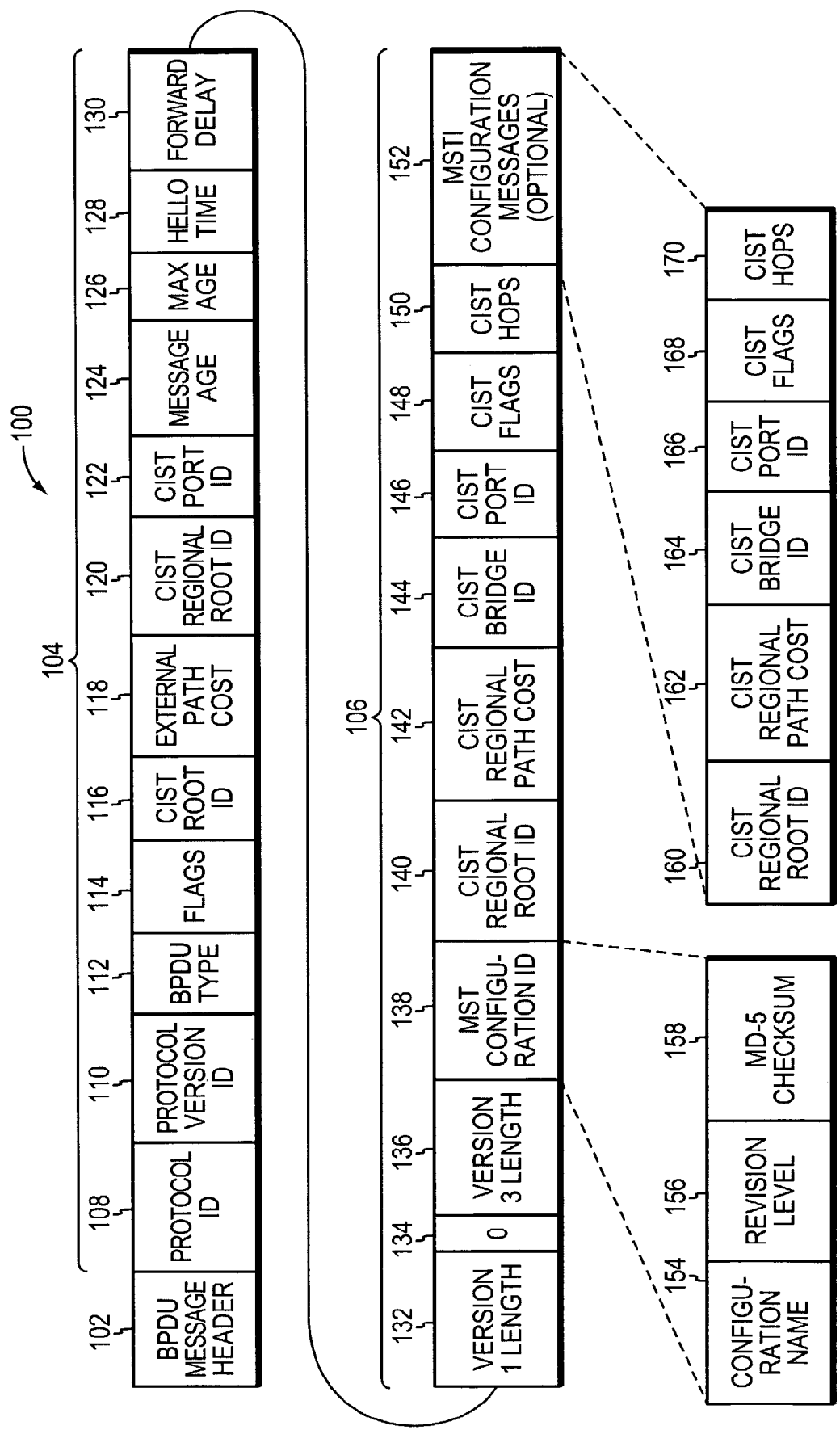
FIG. 1, previously discussed, is a schematic block diagram of a conventional configuration bridge protocol data unit in accordance with the Multiple Spanning Tree Protocol.

In addition to forwarding network messages to and from the ports coupled to Inter-Island Trunks, also referred to as Inter-Island Ports, Island Boundary Bridges also generate and send BPDUs from their ports, including these ports. In particular, the BPDU message generators 418 of the Island Boundary Bridge's MSTP entities 408 formulate MST BPDU messages 100 having the form shown in FIG. 1. The message generators 418 access the MSTP entity's STP memory 424 for the information used in generating the BPDUs. In particular, the MSTP entity's digest generator 422 produces a digest value from its VID/MSTI Translation Table 426 using the MD-5 algorithm. The BPDU message generator 418 then retrieves the Island name, Configuration ID and Revision Level from the STP memory 424, and creates the MST Configuration ID 500, which is preferably inserted into field 138 (FIG. 1) of the MSTP BPDU 100. The BPDU message 418 similarly retrieves STP parameter values from STP memory 424 for loading into the other fields of the BPDU 100.

In addition to the VEC ID established for each VEC traversing an Inter-Island Trunk, an extra VEC and corresponding VEC ID is defined to be used only by IMCP. In particular, the extra VEC ID is used with BPDUs transmitted by the Island Boundary Bridges into the Inter-Island Trunk. That is, the extra VEC ID is loaded in the MPLS Label Stack 802 appended to BPDUs prior to transmission into the Island Interconnect Fabric 208. In the illustrative embodiment, every bridge within an Island that runs IMCP and has a port onto a VEC assigned to a given Inter-Island Trunk also has a port onto the extra VEC. Encapsulated messages received at an Island Boundary Bridge, such as switch 306, that carry the VEC ID for the extra VEC are recognized as Island generated BPDUs. In response, the Virtual Ethernet Channel entity 412 strips off the encapsulation, recovers the BPDU and passes the BPDU to the MSTP entity 408 for processing.

Row 710c may correspond to an entry for the extra VEC, i.e., VEC "301", used in Inter-Island Trunk 242, i.e., "6042", as data VEC "002". As shown, no PE-VLAN ID is assigned to the extra VEC as BPDUs received by an Island Boundary Bridge are not forwarded. The assigned VEC ID is loaded into the Virtual Ethernet Circuit ID field 810 of encapsulated BPDUs prior to transmission into Inter-Island Trunk 242.

As described above, an Inter-Island Trunk functions like a shared-medium Ethernet or a bridged LAN in connectivity. Thus, BPDUs transmitted onto an Inter-Island Trunk are received by all other switches "coupled" to the Inter-Island Trunk as well as by other ports of the switch transmitting the BPDU that also happen to be coupled to the Inter-Island Trunk. Accordingly, BPDUs issued from one Inter-Island Port and encapsulated with the extra VEC ID are delivered to all Inter-Island Ports (other than the port on which they were sent) coupled to the Inter-Island Trunk. The switches, moreover, utilize the information in the received BPDUs to compute an active topology for each MSTI defined at the switch. As a result, for each PE-VLAN ID, an Island will block all but one Island link 210 to the respective Inter-Island Trunk. Because each VEC is associated with a single PE-VLAN ID within each Island, moreover, all but one of the Inter-Island links 210 for each VEC will be blocked. The particular Island link 210 that transitions to the forwarding state may, moreover, vary among PE-VLAN IDs. This provides a measure of load-sharing among the Inter-Island links 210.

When a MAN Provider switch disposed in an Island, including an Inter-Island Bridge, receives a BPDU, it passes the BPDU to the MSTP entity 408. If the BPDU was received on an Inter-Island Port, it will have been encapsulated within an MPLS label stack. In this case, the BPDU like all such messages are passed to the VEC entity 412. The VEC entity 412 determines that the message is encapsulated with the extra VEC ID. In this case, the VEC entity 412 strips off the MPLS label stack and passes the BPDU to the MSTP entity 408. If the BPDU is an MSTP BPDU, the MSTP entity 408 retrieves the MST Configuration ID from field 138 (FIG. 1) and provides it to the comparator 423. Comparator 423 compares the MST Configuration ID from the BPDU with switch's own MST Configuration ID stored at STP memory 424. If all four values match, i.e., they have the same Island names, the same Configuration names, the same Revision Levels and the same Configuration Digests, then the received BPDU is utilized by the switch in its computation of active topologies. That is, the BPDU is presumed to have been sent by another switch in the same Island or by the same switch but from a different Inter-Island port.

Where an Island has multiple connections to an Inter-Island Trunk, this ensures that, for each PE-VLAN ID defined within a given Island, there is only one port connecting the Island to the Inter-Island Trunk. In other words, the port role selection state machine 414 and the port transition state machine 416 transition only one such port to a forwarding state. All other ports are transitioned to the blocking state for this PE-VLAN ID. In addition, each VEC is mapped to a single PE-VLAN ID. Thus, frames associated with a given VEC ID can only be sent and received from a single port coupled to the respective Inter-Island Trunk. Also, the MAN Provider configures the Islands so that the only connections between the Islands are Inter-Island Trunks, and that any given VEC is carried on no more than one Inter-Island Trunk. The combination of these steps, prevents the formation of loops.

If an Island has exactly two Inter-Island Ports onto a given Inter-Island Trunk, they are preferably configured as point-to-point links so as to take advantage of the rapid spanning tree convergence properties of MSTP/RSTP.

If the Island ID field 502 of the MST Configuration ID 500 matches that stored by the receiving switch, but any other part of the BPDU's MST Configuration ID does not match, i.e., the Configuration Name, the Revision Level and/or Configuration Digest value are different, then the switch treats the received BPDU as a conventional RSTP. That is, the switch utilizes the information in the BPDU's outer part 104 (FIG. 1) to cooperate in the calculation of a single CIST with the bridge that sourced the BPDU, but ignores the information in the inner part 106. This situation might occur when the MAN Provider is in the process of updating the VID/MSTI Translation Tables, and thus Revision Levels, of the switches located within a given Island.

If the Island ID 502 specified in the received BPDU does not match the Island ID stored by the switch in its STP memory 424 and the Root ID identified in the BPDU's CIST Root ID field 116 does not match the corresponding value stored at the STP memory 424, then the MSTP entity 408 ignores and discards the received BPDU. In this case, the received BPDU is presumed to have been sent by a switch disposed in some other Island. It is a precondition to connecting a bridge to the BPDU VEC to ensure that the choice of Island names is consistent with the names used by other switches connecting to the same BPDU VEC. The MAN Provider may accomplish this through administrative action, e.g., by correctly setting the contents of the STP memories 424 of the respective switches.

If the Island ID specified in the received BPDU does not match the switch's Island ID, but the Root ID in field 116 does match, the MSTP entity 408 preferably transitions the port on which the BPDU was received to the blocking state for all VLANs and issues an alarm to the MAN Provider. This situation reflects a mis-configuration of the MAN Provider's Islands. Specifically, it suggests that two different Islands are interconnected by a link(s) other than an Inter-Island Trunk. Furthermore, if at any port other than an Inter-Island Port, a BPDU is received whose Island name does not match the receiving switch's Island name or which is not an MST BPDU, then the port is blocked for all PE-VLAN IDs, and an operator alarm is signaled.

Similarly, if a BPDU is received that does not have an Island ID field 502, it is discarded and not relied upon by the receiving bridge in its spanning tree calculations.

Figure 9:
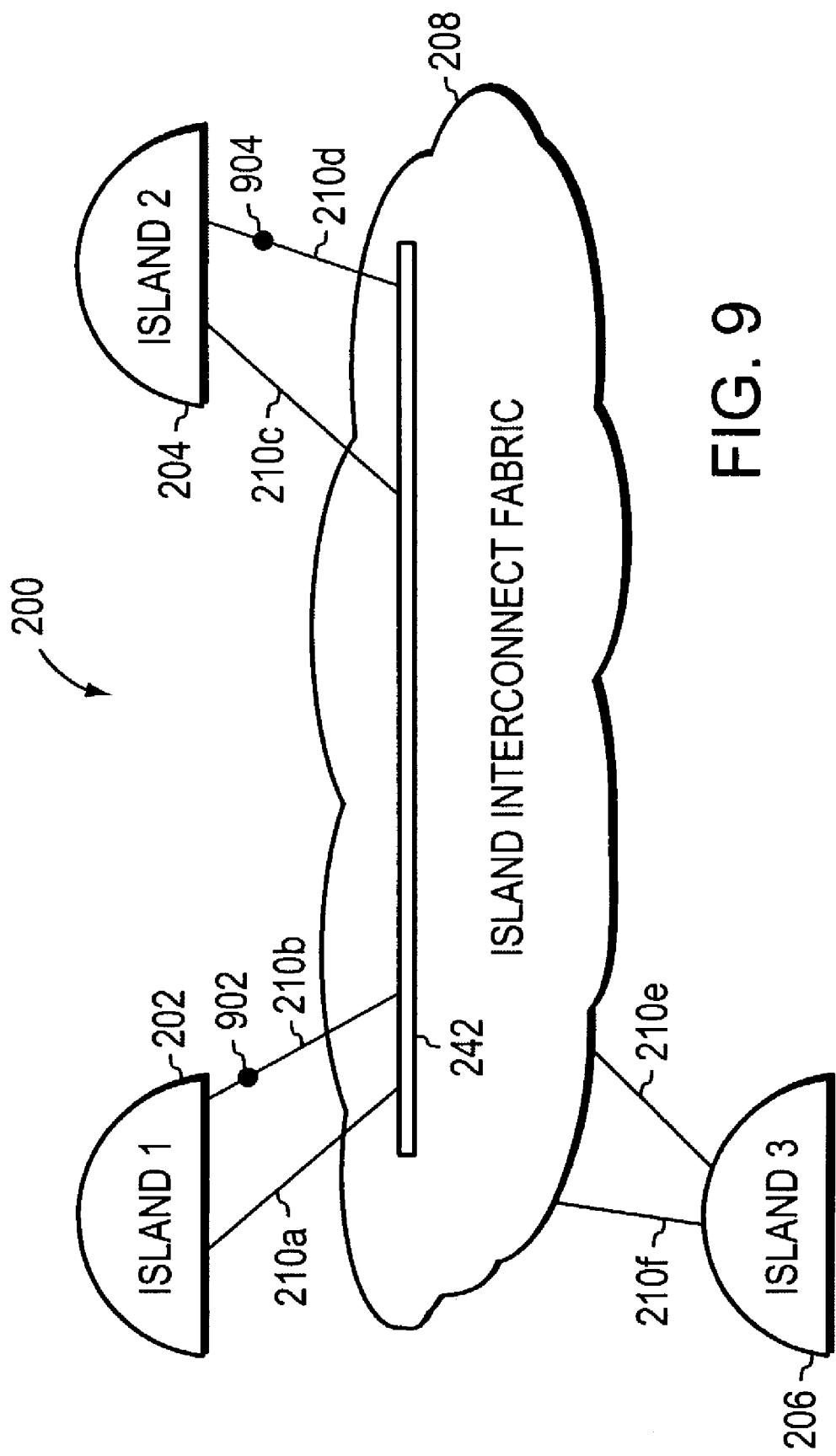
FIGS. 9-11 are highly schematic partial illustrations of the MAN of FIG. 2.

FIG. 9 is a highly schematic, partial block diagram of network 200 illustrating Inter-Island Trunk 242 disposed within Island Interconnect Fabric 208 and configured to carry traffic for the second VEC. As described above, the second VEC extends between Islands 202 and 204. Each of these Islands 202 and 204, moreover, have two Inter-Island links 210a, 210b and 210c and 210d, respectively. Each Island 202 and 204 prevents the formation of a loop that would otherwise be caused by the existence of Inter-Island Trunk 242 by placing all but one of its ports coupled to Inter-Island Trunk 242 in the blocking state. For example, the port coupled to Island link 210b at Island 202 and the port coupled to Island link 210d at Island 204 may each be transitioned to the blocking state, as indicated by dots 902 and 904. The ports corresponding to links 210a and 210c, on the other hand, are each transitioned to forwarding.

Figure 10:
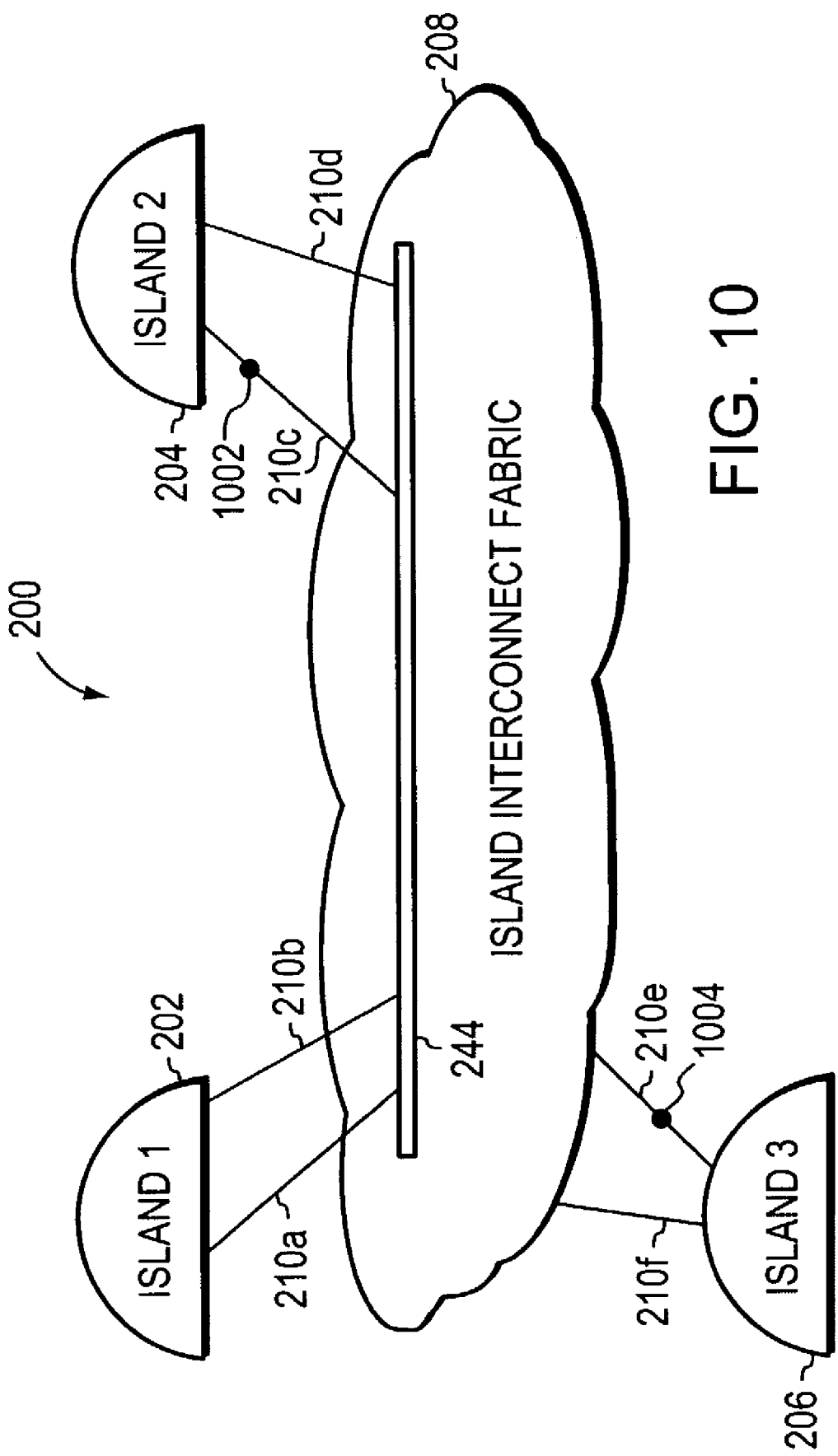

FIG. 10 is a highly schematic, partial block diagram of MAN 200 illustrating Inter-Island Trunk 244 disposed within Island Interconnect Fabric 208 and configured to carry traffic for the third VEC configured to connect customer sites 216 and 217 (FIG. 2) via Islands 204 and 206. Islands 204 and 206 are coupled to Inter-Island Trunk 244 via Inter-Island links 210c, 210d and 210e and 210f. Each Island 204 and 206 prevents the formation of a loop that would otherwise be caused by the existence of Inter-Island Trunk 244 by placing all but one of its ports coupled to Inter-Island Trunk 244 in the blocking state. For example, the port coupled to Island link 210c at Island 204 the port coupled to Island link 210e at Island 206 may each be transitioned to the blocking state, as indicated by dots 1002 and 1004. The ports corresponding to links 210d and 210f transition to forwarding.

Figure 11:
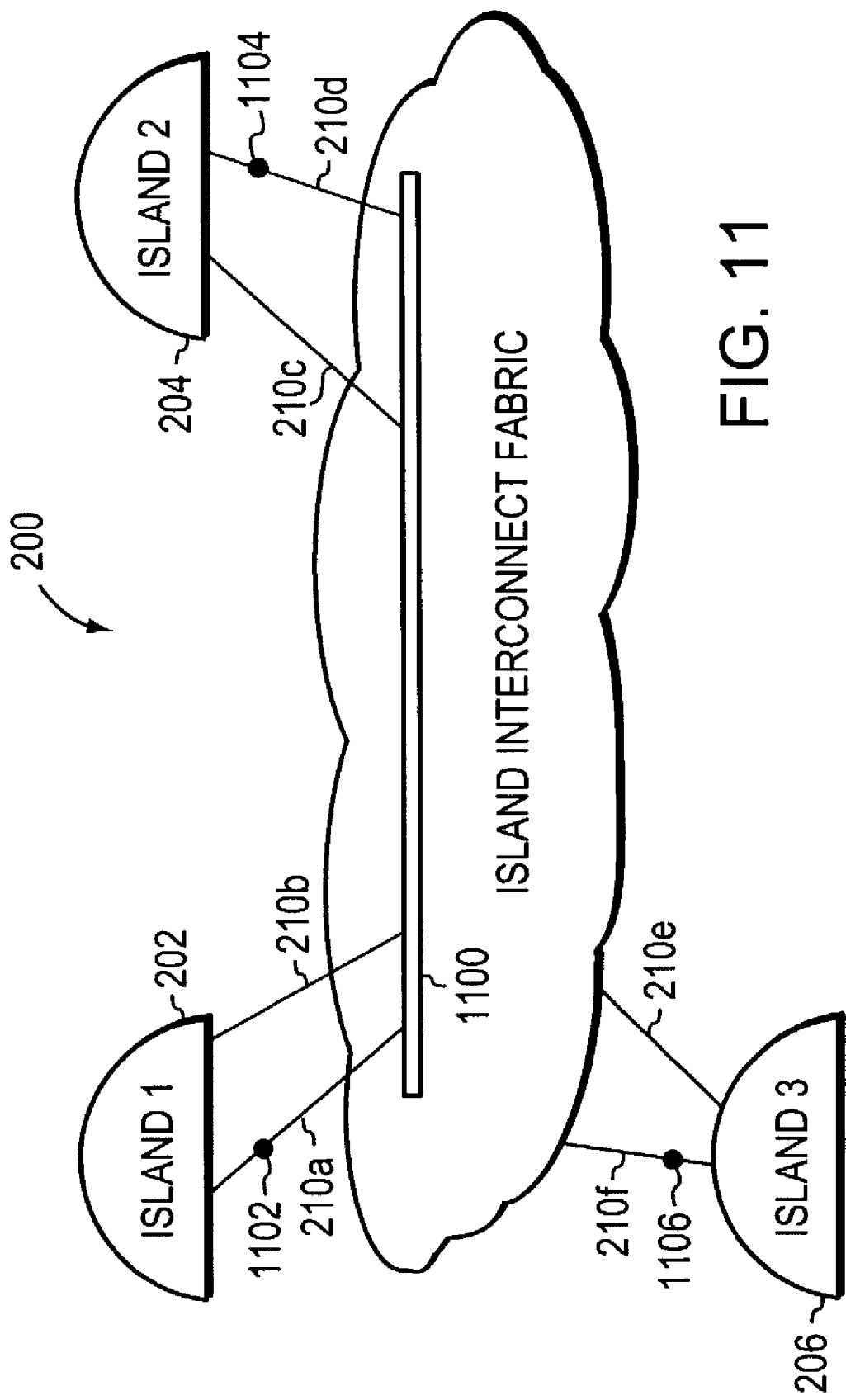

Suppose that Islands 202, 204 and 204 are further configured to provide a fourth VEC for interconnecting customer sites 213, 216 and 217. FIG. 11 is a highly schematic, partial block diagram of MAN 200 illustrating an Inter-Island Trunk 1100 disposed within Island Interconnect Fabric 208 that has been configured to carry traffic for the fourth VEC. Here, all four Inter-Island links 210a-d connect to Inter-Island Trunk 1100. To prevent the formation of loops, each Island 202, 204 and 206 places all but one of its ports coupled to Inter-Island Trunk 1100 in the blocking state. For example, the port coupled to Island link 210c at Island 204, the port coupled to Island link 210d at Island 204 and the port coupled to Island link 210f at Island 206 may each be transitioned to the blocking state, as indicated by dots 1102, 1104 and 1106. The ports corresponding to links 210b, 210c and 210e each transition to forwarding.

As shown in FIGS. 9-11, although each Island is coupled to the Island Interconnect Fabric by multiple Inter-Island links, the formation of loops are specifically avoided. In addition, traffic is load-shared among the Inter-Island links 210.

Figure 12:
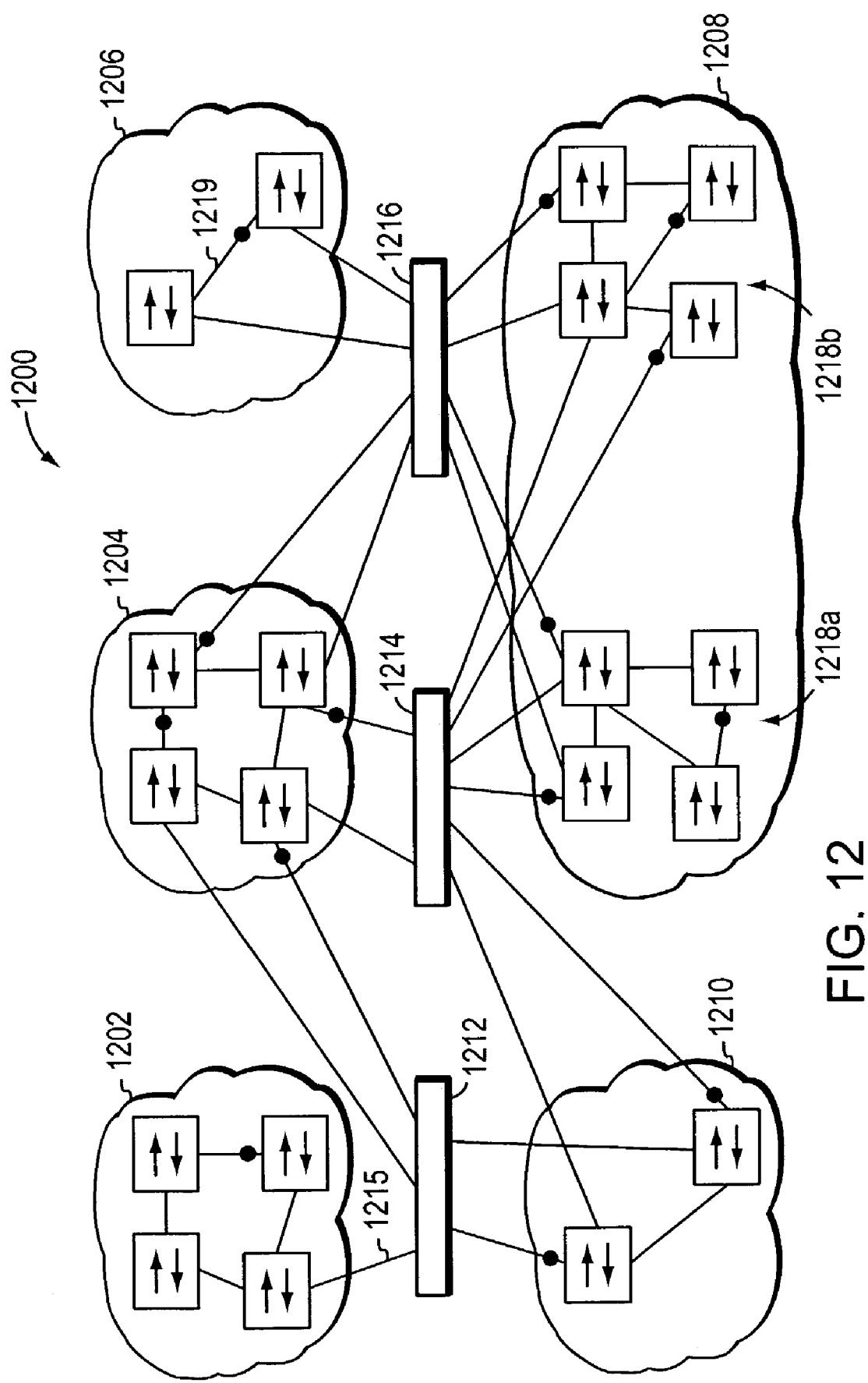
FIGS. 12 and 13 are highly schematic illustrations of another MAN in accordance with the present invention.

FIG. 12 is a highly schematic illustration of another Inter-Island Trunk 1200 in accordance with the present invention. The Island Interconnect Fabric has been omitted for clarity. Inter-Island Trunk 1200 includes a plurality of Islands 1202-1210. Each Island, moreover, has a plurality of interconnected bridges. As shown, there are three VECs 1212-1216 formed among the Islands 1202-1210, all carried on a single Inter-Island Trunk. Island 1202 has only a single connection 1215 to VEC 1212. Therefore, if connection 1215 is lost, Island 1202 loses connectivity with Islands 1204 and 1210. The bridges of Island 1208 are organized into two parts, part 1218a and 1218b, each made up of four interconnected bridges. However, there are no connections between the bridges forming the two parts 1218a and 1218b inside of Island 1208. Instead, the two parts 1218a and 1218b of Island 1208 utilize VECs 1214 and 1216 for intercommunication. Similarly, at Island 1206, execution of the IMCP results in link 1219 between the two bridges being blocked. The two bridges of Island 1206 utilize VEC 1216 to intercommunicate.

Figure 13:
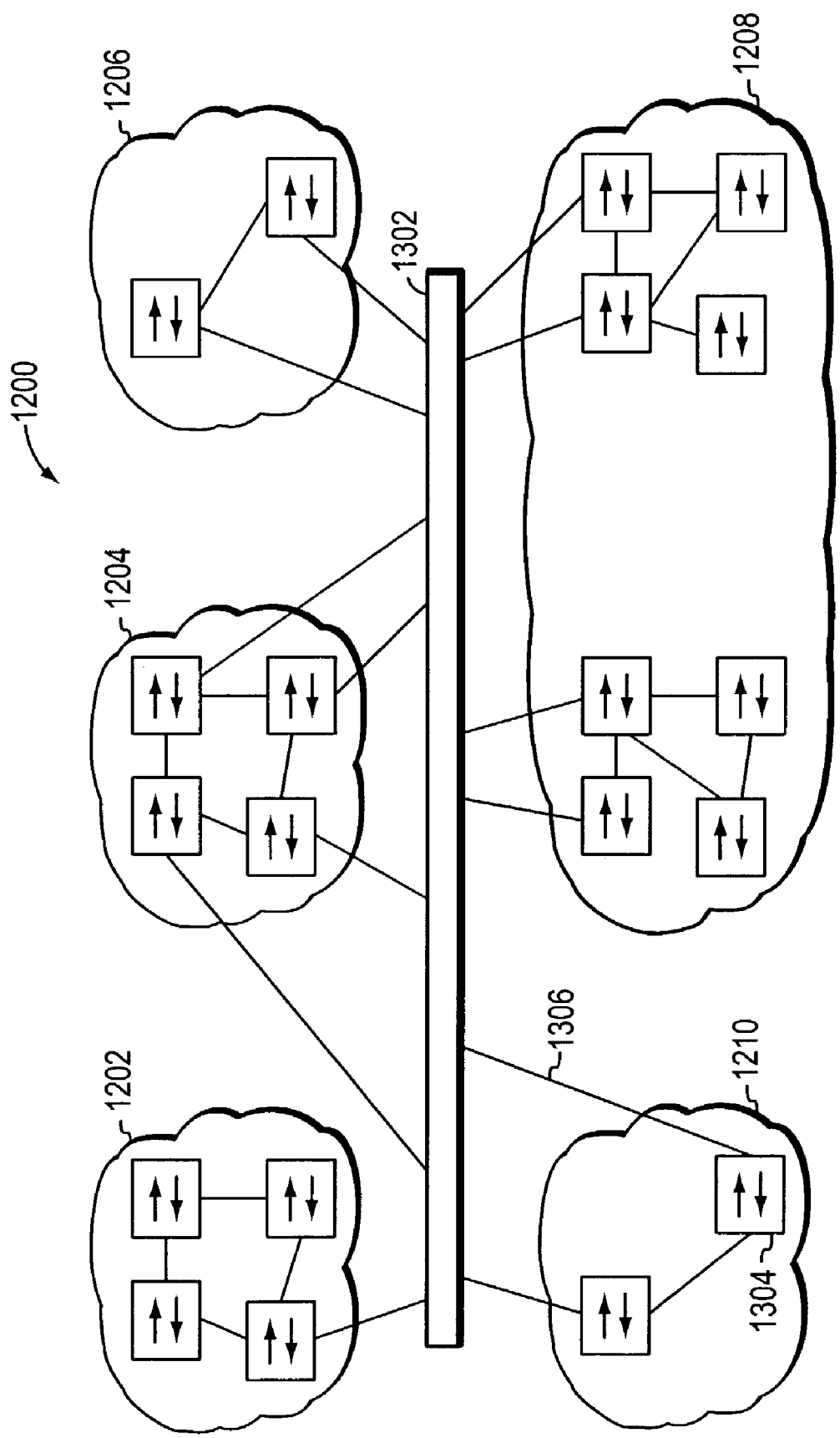

FIG. 13 is a highly schematic illustration of the same Inter-Island Trunk 1200 as FIG. 12. However, the VECs have been omitted for clarity and the BPDU VEC or BPDU Service Instance 1302 is shown. As mentioned above, each Inter-Island Bridge of the Islands 1202-1210 that are connected to an Inter-Island Trunk have a connection to the BPDU VEC 1302. As described herein, the Inter-Island Bridges utilize the BPDU VEC 1302 to exchange BPDUs among themselves. The Inter-Island Bridges use these received BPDUs in their execution of the IMCP to identify and block redundant links to the VECs. For those Inter-Island Bridges connected to multiple VECs on a given Inter-Island Trunk, only a single connection is required to the BPDU VEC 1302. For example, bridge 1304 at Island 1210 which is connected to VECs 1212 and 1214 (FIG. 12) need only establish a single connection 1306 to the BPDU VEC 1302.

Within each Island, the Island Boundary Bridges run the IMCP on their Inter-Island Ports. For the other ports, i.e., non Inter-Island Ports, within an Island, either the IMCP or MSTP may be run.

In an alternative embodiment, the unmodified IEEE P802.1S/D13 Multiple Spanning Tree protocol may be used instead of the IMCP. In this case, each Inter-Island Trunk must have a separate BPDU VEC for each Island. Conversely, each Inter-Island Bridge must be configured, for each Inter-Island Trunk, to attach to the same BPDU VEC as the other Inter-Island Bridges in that same Island. Furthermore, if multiple Inter-Island Trunks are employed, then the set of Islands interconnected by each Inter-Island Trunk's BPDU VECs must be identical. Thus, the connectivity of the BPDU VECs defines the Islands, rather than the comparison of Island IDs. Since the Inter-Island Bridges of different Islands are not interconnected on any BPDU VEC, they cannot detect and report erroneous connections between Islands that do not utilize Inter-Island Trunks.

As mentioned above, there are different categories of VECs. The VECs described above correspond to "bridge-like" VECs in which the CE-VLAN IDs of received frames are altered within the Island. Additionally, network messages corresponding to L2 protocols that are not used for customer-MAN interaction, such as IEEE Std. 802.3-2000 pause frames (also known as 802.3x pause frames) are discarded upon receipt at the UNI. As indicated above, BPDUs from the customer sites are never utilized by the switches disposed in the Islands in their computation of the CIST. With "wire-like" VECs, CE-VLAN ID tagged frames are carried transparently through the MAN as are network messages corresponding to L2 protocols that are not used for customer-MAN interaction.

It should be further understood that an Island may consist of a single L2 switch. In this case, the PE-VLAN IDs are confined to the single switch.

The foregoing description has been directed to specific embodiments of this invention. It will be apparent, however, that other variations and modifications may be made to the described embodiments, with the attainment of some or all of their advantages. Therefore, it is an object of the appended claims to cover all such variations and modifications as come within the true spirit and scope of the invention.

What is claimed is:

1. A method of preventing Layer 2 (L2) loops in a Metropolitan Area Network (MAN) having a plurality of intermediate network devices, and providing a plurality of Virtual Ethernet Connections (VECs), each representing a virtual shared medium, the method comprising the steps of:
   organizing the plurality of intermediate network devices into two or more administrative groups, each containing one or more intermediate network devices;
   using an Interconnect Fabric to couple the two or more administrative groups by providing redundant links between each administrative group and the Interconnect Fabric;
   defining one or more logical Trunks within the Interconnect Fabric, each logical Trunk representing a shared medium connecting two or more administrative groups;
   assigning each VEC to no more than one logical Trunk; and
   for each VEC provided by an administrative group, blocking all but one of the redundant links to the Interconnect Fabric.

2. The method of claim 1 further comprising the steps of:
   within each administrative group, defining a plurality of Provider Equipment Virtual Local Area Network (PE-VLAN) Identifiers (IDs); and
   within each administrative group, associating a given VEC with exactly one PE-VLAN ID.

3. The method of claim 2 wherein the PE-VLAN IDs defined within two administrative groups and associated with the same VEC are dissimilar.

4. The method of claim 1 wherein the step of blocking comprises the steps of:
   providing a separate VEC for configuration bridge protocol data unit (BPDU) messages generated by the intermediate network devices of the administrative groups of the MAN; and
   assigning a Multiple Spanning Tree (MST) Configuration Identifier (ID) to each intermediate network device of the MAN, the MST Configuration ID specifying an Island name.

5. The method of claim 4 further comprising the steps of:
   receiving from a logical Trunk one or more BPDU messages associated with the VEC at a given intermediate network device of an administrative group, each received BPDU message specifying an MST Configuration ID and a first root; and
   using the received BPDU message in computing a spanning tree instance in accordance with a Multiple Spanning Tree Protocol (MSTP), provided that the MST Configuration ID of the received BPDU matches the MST Configuration ID assigned to the given intermediate network device.

6. The method of claim 5 wherein
   the MST Configuration IDs further specify a Configuration name, a Revision level and a Configuration digest, and
   two MST Configuration IDs match where the specified Island names, Configuration names, Revision levels and Configuration digests all match.

7. The method of claim 6 further comprising the steps of:
   storing a root ID at the given intermediate network device; and
   discarding the received BPDU, if the Island name of the received BPDU's MST Configuration ID does not match the Island name of the MST Configuration ID assigned to the given intermediate network device, and the received BPDU's first root does not match the root ID stored by the given intermediate network device.

8. The method of claim 5 wherein
   the MST Configuration IDs further specify a Configuration name, a Revision level and a Configuration digest, and
   the step of blocking further comprises the steps of using the received BPDU in computing a spanning tree instance in accordance with a Rapid Spanning Tree Protocol (RSTP) specification standard, if the Island name of the received BPDU matches the Island name of the given intermediate network device, but one or more of the Configuration name, Revision level and Configuration digest of the received BPDU does not match the respective one of the Configuration name, Revision level and Configuration digest assigned to the given intermediate network device.

9. The method of claim 1 wherein
   each administrative group of the MAN is identified as a corresponding Island, and a plurality of customer networks are coupled to each Island.

10. The method of claim 9 wherein the customer networks send configuration bridge protocol data unit (BPDU) messages into their respective Islands, the method further comprising the step of returning BPDU messages generated in the customer networks back to the customer networks unmodified.

11. The method of claim 1 wherein the step of blocking comprises the steps of:
    configuring a logical Trunk so that each intermediate network device can communicate configuration bridge protocol data unit (BPDU) messages over the logical Trunk only with intermediate network devices that belong to the same administrative group; and
    using a received BPDU messages in computing a spanning tree instance in accordance with a Multiple Spanning Tree Protocol (MSTP).

12. An intermediate network device for use in forwarding network messages within a computer network, the intermediate network device comprising:
    a plurality of ports configured to send and receive the network messages;
    means for associating the intermediate network device with an Island name, a Configuration name, a Revision level and a Configuration digest;
    means for issuing configuration bridge protocol data unit (BPDU) messages with the Island name, Configuration name, Revision level and Configuration digest associated with the intermediate network device; and
    means for utilizing one or more received BPDU messages in computing a spanning tree instance provided that each of the Island name, Configuration name, Revision level and Configuration digest of the one or more received BPDU messages matches the respective Configuration name, Revision level and Configuration digest associated with the intermediate network device.

13. The intermediate network device of claim 12 further comprising means for preventing one or more received BPDU messages from being used in computing the spanning tree instance where the Island name of the one or more received BPDU messages does not match the Island name associated with the intermediate network device.

14. An apparatus comprising:
    a plurality of ports configured to send and receive network messages in a computer network;

a spanning tree protocol (STP) memory configured to associate the apparatus with an island name, a configuration name, a revision level and a configuration digest;

a configuration bridge protocol data unit (BPDU) message generator configured to issue BPDU messages with the island name, configuration name, revision level and configuration digest associated with the apparatus; and a multiple spanning tree protocol entity configured to utilize one or more received BPDU messages to compute a spanning tree instance provided that each of the island name, configuration name, revision level and configuration digest of the one or more received BPDU messages matches the respective configuration name, revision level and configuration digest associated with the apparatus.

15. The apparatus of claim 14 further comprising wherein the multiple spanning tree protocol entity is further configured to prevent one or more received BPDU messages from being used in computation of the spanning tree instance, where the island name of the one or more received BPDU messages does not match the island name associated with the apparatus.

16. An apparatus for preventing loops in a computer network that is organized into a plurality of administrative groups interconnected by an interconnect fabric, the apparatus comprising:

a first port configured to receive a network message;

a memory configured to store an association between a Virtual Ethernet Connection (VEC) and a first link of two or more links that couple a first administrative group to the interconnect fabric, wherein the VEC represents a virtual shared medium that connects the first administrative group to a second administrative group of the plurality of administrative groups;

a second port configured to connect to the interconnect fabric using the first link; and a processor configured to associate the network message with the VEC, to transmit the network message from the second port, and to block all but the first link of the two or more links.

17. The apparatus of claim 16 wherein the processor is further configured to define a plurality of Provider Equipment Virtual Local Area Network (PE-VLAN) Identifiers (IDs) and associate the VEC with exactly one PE-VLAN ID.

18. The apparatus of claim 16 wherein the memory is further configured to store a separate VEC for configuration bridge protocol data unit (BPDU) messages.

19. The apparatus of claim 16 wherein each administrative group of the plurality of administrative groups is an island that has a plurality of customer networks coupled thereto.

20. The apparatus of claim 16 wherein the memory is further configured to store a first multiple spanning tree (MST) configuration identifier (ID) associated with the apparatus, and wherein the network message comprises a bridge protocol data unit (BPDU) message specifying a second MST configuration ID.

21. The apparatus of claim 20 wherein the processor is further configured to compute a spanning tree instance in accordance with a Multiple Spanning Tree Protocol (MSTP), in response to the second MST configuration ID matching the first MST configuration ID.

22. The apparatus of claim 20 wherein each MST configuration ID comprises an administrative group name, a configuration name, a revision level, and a configuration digest.

23. The apparatus of claim 22 wherein the memory is further configured to store a first root ID, wherein the network message further comprises a second root ID, and wherein the processor is configured to discard the BPDU message in response to the administrative group name of the second MST configuration ID not matching the administrative group name of the first MST configuration ID, and further in response to the second root ID not matching the first root ID.

24. The apparatus of claim 22 wherein the processor is further configured to compute a spanning tree instance in accordance with a Rapid Spanning Tree Protocol (RSTP) in response to the administrative group name of the second MST configuration ID not matching the administrative group name of the first MST configuration ID, and further in response to one or more of the group consisting of the configuration name, the revision level, and the configuration digest of the second MST configuration ID not matching a respective one or more of the group consisting of the configuration name, the revision level, and the configuration digest of the first MST configuration ID.

25. The apparatus of claim 16 wherein the plurality of administrative groups form a Metropolitan Area Network (MAN).

* * * * *